United States Patent
Sun

(10) Patent No.: US 10,418,822 B2
(45) Date of Patent: Sep. 17, 2019

(54) ENERGY PRODUCTION AND FREQUENCY REGULATION CO-OPTIMIZATION FOR POWER GENERATION SYSTEMS

(71) Applicant: Mitsubishi Electric Research Laboratories, Inc., Cambridge, MA (US)

(72) Inventor: Hongbo Sun, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/432,485

(22) Filed: Feb. 14, 2017

(65) Prior Publication Data

US 2018/0233922 A1     Aug. 16, 2018

(51) Int. Cl.
| | |
|---|---|
| *H02J 3/46* | (2006.01) |
| *H02J 3/38* | (2006.01) |
| *G06F 17/17* | (2006.01) |
| *G05B 15/02* | (2006.01) |
| *G06Q 10/04* | (2012.01) |

(Continued)

(52) U.S. Cl.
CPC ............... *H02J 3/46* (2013.01); *G05B 15/02* (2013.01); *G06F 17/17* (2013.01); *G06Q 10/04* (2013.01); *G06Q 10/063* (2013.01); *G06Q 50/06* (2013.01); *H02J 3/382* (2013.01); *H02J 2003/003* (2013.01); *H02J 2003/007* (2013.01); *Y02E 40/76* (2013.01); *Y04S 10/545* (2013.01)

(58) Field of Classification Search
CPC ........ H02J 3/46; H02J 3/382; H02J 2003/003; H02J 2003/007; H02J 3/00; H02J 3/008; H02J 3/14; G05B 15/02; G05B 13/02; G06F 17/17; G05F 1/66; G06Q 50/06; G06Q 10/06

USPC ........................................................ 700/287
See application file for complete search history.

(56) References Cited

U.S. PATENT DOCUMENTS

| | | |
|---|---|---|
| 7,349,882 B2 | 3/2008 | Bjelogrlic et al. |
| 8,949,160 B2 | 2/2015 | Ghosh et al. |

(Continued)

FOREIGN PATENT DOCUMENTS

WO     2014154305 A1     10/2014

OTHER PUBLICATIONS

Ma, Juan, et al. "Evaluating and planning flexibility in sustainable power systems." Power and Energy Society General Meeting (PES), pp. 1-188, 2013 IEEE. IEEE, (Jul. 21, 2013). (Year: 2013).*

(Continued)

*Primary Examiner* — Brian W Wathen
*Assistant Examiner* — Alicia M. Choi
(74) *Attorney, Agent, or Firm* — Gennadiy Vinokur; James McAleenan; Hironori Tsukamoto

(57) ABSTRACT

A method to co-optimize the energy production and frequency regulation of power generation systems. A three-level co-optimization model is used to determine the day-ahead unit commitment schedule considering the impacts of real-time generation dispatch and frequency regulation. Generation upward and downward regulation speed constraints are added to represent the system requirements for generation quick responses, and the actual regulation performance is also taken into account through the simulation of primary generation control.

20 Claims, 17 Drawing Sheets

(51) Int. Cl.
  *G06Q 10/06* (2012.01)
  *G06Q 50/06* (2012.01)
  *H02J 3/00* (2006.01)

(56) References Cited

U.S. PATENT DOCUMENTS

| | | | |
|---|---|---|---|
| 9,031,798 B2 | 5/2015 | Kalagnanam et al. | |
| 9,742,411 B1* | 8/2017 | Fan | H03L 5/02 |
| 2011/0071690 A1 | 3/2011 | Sun | |
| 2012/0041610 A1* | 2/2012 | Varigonda | F01D 15/10 |
| | | | 700/288 |
| 2013/0013233 A1* | 1/2013 | Murakami | H02J 3/38 |
| | | | 702/60 |
| 2013/0035885 A1* | 2/2013 | Sharon | G06F 17/509 |
| | | | 702/61 |
| 2013/0054211 A1 | 2/2013 | Franke et al. | |
| 2013/0317959 A1* | 11/2013 | Joos | C25B 15/02 |
| | | | 705/34 |
| 2013/0321040 A1* | 12/2013 | Johal | H02J 3/14 |
| | | | 327/113 |
| 2014/0039710 A1* | 2/2014 | Carter | G06Q 10/06 |
| | | | 700/291 |
| 2014/0049109 A1* | 2/2014 | Kearns | H02J 3/00 |
| | | | 307/52 |
| 2014/0070756 A1* | 3/2014 | Kearns | H02J 7/007 |
| | | | 320/101 |
| 2014/0330695 A1* | 11/2014 | Steven | G06Q 30/0283 |
| | | | 705/37 |
| 2015/0039145 A1* | 2/2015 | Yang | G05B 13/02 |
| | | | 700/291 |
| 2015/0094968 A1* | 4/2015 | Jia | G06Q 40/04 |
| | | | 702/60 |
| 2015/0127425 A1* | 5/2015 | Greene | G06Q 30/0202 |
| | | | 705/7.31 |
| 2015/0134135 A1* | 5/2015 | Wong | H02J 3/38 |
| | | | 700/295 |
| 2015/0184632 A1* | 7/2015 | Sagi | F03D 7/048 |
| | | | 290/44 |
| 2015/0278968 A1* | 10/2015 | Steven | G06Q 50/06 |
| | | | 705/7.35 |
| 2016/0313716 A1* | 10/2016 | Chen | H02J 4/00 |
| 2016/0370819 A1* | 12/2016 | Forbes, Jr. | G06Q 10/06 |
| 2017/0005515 A1* | 1/2017 | Sanders | H02J 3/381 |
| 2017/0060162 A1* | 3/2017 | Holzman | G05F 1/66 |
| 2017/0229896 A1* | 8/2017 | Kearns | H02J 7/007 |
| 2018/0048150 A1* | 2/2018 | Frasher | G05B 13/048 |
| 2018/0048154 A1* | 2/2018 | Guo | H02J 3/16 |

OTHER PUBLICATIONS

Aien, Morteza, Mahmood Fotuhi-Firuzabad, and Farrokh Aminifar. "Unscented transformation-based probabilistic optimal power flow for modeling the effect of wind power generation." Turkish Journal of Electrical Engineering & Computer Sciences</i>; Section 21.5, pp. 1284-1301;(Sep. 4, 2013). (Year: 2013).*

Nerc: "Variable Generation Power Forecasting for Operations," Aug. 11, 2016, XPO55411743 https://web.archive.org/web/20160811003734/http://www.nerc.com/docs/pc/ivgtf/task2-1%285.20%29.pdf retrieved Oct. 2, 2017. p. 4, par 1-2, sections 2.3, 24, 2.7.

* cited by examiner

ENERGY PRODUCTION AND FREQUENCY REGULATION CO-OPTIMIZATION FOR POWER GENERATION SYSTEMS

FIELD

The present disclosure relates generally to power system operation and control, and more particularly to Co-optimization of Energy Production and Frequency Regulation for Power Generation Systems.

BACKGROUND

Independent system operators are responsible for maintaining an instantaneous and continuous balance between supply and demand of power system through managing the energy and reserve transactions of energy and reserve markets, including day-ahead market and real-time market. According to the forecasted or historical load and non-dispatchable generation profiles for next day, the commitment schedule of dispatchable generation units for next 24 hours are determined through solving a security-constrained unit commitment problem and a security-constrained economic dispatch problem. The unit commitment is determined by finding the least cost unit commitment solution for the second day while respecting both system-wide and unit-wise constraints. By fixing the unit commitment variables, the economic dispatch is solved, and the locational marginal price for energy and reserve are then obtained as byproducts of the economic dispatch problem. This task is complicated by the increased presence of distributed energy resources and the continuing improvements on market regulations.

The unpredictable nature of renewable energy sources leads to greater fluctuations in the amount of generated power available. To achieve a power balance in the presence of heightened volatility, the operators have to increase the reserve capacities and chose more fast-response units to reduce the power outage risk at certain cost. The goal of co-optimization of energy and reserve is to make a best compromise between uncertainty and cost. The challenge is that the renewables may demonstrate different characteristics in term of fluctuation magnitudes and frequency if the renewable data sets are collected using different sampling rates. A unit commitment schedule, that conventionally determined based on renewable profiles generated at longer time scale (such as one sample each hour) might not be optimal when implemented in real time. On one hand, it might not have sufficient reserves to deal with actual renewable variation measured at shorter time scale (such as one sample each 5 minutes, or 4 seconds). Or, the response speeds of chosen generating units might not fast enough to catch up the renewable variation frequency measured in such shorter scale. On the other hand, the unit commitment schedule might have chosen too much reserve or too many fast-response generation units that caused losing the economic efficiency.

Meanwhile, the market regulatory rules have also required the generation units rewarded by their services that they have actually provided or achieved in real time. For example, the generate units acting for frequency regulation resources should be compensated based on their actual contributions to the system frequency quality. That is, the payment should reflect the quality of frequency regulation service provided by the resource when the resource is required to follow system regulation signal. The signal following is typically implemented through a frequency controller of the generating unit. This requirement is usually satisfied through a two-step procedure. The generation units are initially rewarded by the prices determined by the day-ahead market based on the hourly profiles. The payments are then adjusted after the operation cycle based on real-time prices determined according to actual real-time profiles. Such approach can be easily implemented, but the generation plants hardly get their benefits maximum through such procedure. The main reason is that when the commitment status of a generation unit is determined, its contribution and performance for frequency regulation are highly constrained by its committed status, since the generating unit has to keep on its commitment statues for a while due to its technical minimum up/down time constraints. Without taking the real-time renewable and load fluctuations into account in some manners, the gaps or deviations between day-ahead schedules and real-time dispatch and control hardly be mitigated.

There are several methods existing to deal with the unit commitment problem with stochastic characteristics. For example, U.S. Pat. No. 7,349,882 B2 disclosed a method for optimizing security constrained unit commitment in the day ahead wholesale electricity market using mixed integer linear programming techniques. U.S. Pat. No. 9,031,798 B2 disclosed systems and methods for solving large-scale stochastic unit commitment problems using a branch-cut-price algorithm. However, those existing approaches have not considered the actual generation dispatch and frequency regulation performance for generation units with sufficient details in the determination of generation commitment schedule.

Therefore, there is a need for developing new approaches for the day-ahead power market to appropriately considering the real-time operation and control and resource and load uncertainty when co-optimizing the energy production and frequency regulation.

SUMMARY

The present disclosure relates to a method to co-optimize the energy production and frequency regulation of a power generation system (PGS). The PGS includes a set of generators for producing energy to be later consumed by loads of the PGS. The set of generators include at least one generator acting for regulating frequency of the power generation system, and at least one generator that is a renewable source of energy.

The embodiments of the present disclosure are based on addressing how to account for volatility of energy production and consumption for the next energy cycle in determining commitment for their energy generators. To find solutions to these problems we focused on the challenges presented by the volatility of energy production due to renewable energy sources, along with volatilities due to event driven energy demand in energy consumption. At least one reason the present disclosure needed to identify such solutions, is that energy providers are required to somehow estimate for their next future upcoming energy cycle "an expected energy production and consumption for their energy generators". However, because there are not currently accurate forecasting solutions for estimating future energy production and consumption for the upcoming energy cycle, the energy providers are saddled with poor or inefficient energy reserve management. Which leads to over extending of their generator output capacities and requiring the energy providers to make up for the un-forecasted energy supply (due to the incorrect energy demand/consumption forecasting), by having to purchase the energy from third parties and/or from reserve markets at a premium cost. These unplanned expenses, buying energy from third parties along with overextending their generator's capacities, i.e. increased maintenance costs, leads to increase costs that are later passed down to the consumer.

In addressing these challenges, we realized that offline commitment estimation for energy generation and capacity reserve should combine principles of offline forecasting and current online updates. Which will increase the accuracy of the commitment estimation while maintaining the legacy of the current online update.

Specifically, we realized that the energy commitment should be determined on an hourly basis, and updated using forecast of energy generation and consumption determined with the precision of real-time generation dispatch update, and further updated with the forecast of energy production and consumption determined with precision of real-time frequency regulation update. In such a manner, offline and online operations are "synchronized".

We later discovered through experimentation, a three-level co-optimization model that can be used to determine a day-ahead unit commitment schedule considering the impacts of real-time generation dispatch and frequency regulation. Where the generation upward and downward regulation speed constraints are added to represent the system requirements for generation quick responses, and the actual regulation performance is also taken into account through the simulation of primary generation control.

For example, the systems and methods of the present disclosure can be implemented as a control system for managing and controlling the PGS. The control system can include a processor, a receiver, and a controller. The processor can be used for estimating energy production and frequency regulation of each generator for a future period of a production time. The processor uses an estimation of future generation and consumption of the energy of the PGS for the production time. Wherein using our realization, we have a production of time that includes equal lengths of segments of time, each segment of time includes a plurality of equal portions of time, and each portion of time includes equal sections of time. The processor can be further configured for determining a unit commitment schedule of each generator. The commitment schedule includes a set of committed statuses, and a set of production set points for each segment of the production time, based on reducing a total of unit commitment, generation dispatch and frequency regulation of each generator. The generation dispatch and frequency regulation cost are approximated as linear functions of production set points for the segments of time. Wherein the equal lengths of the segments of time define a time resolution of the production time for the unit commitment schedule.

We also learned through experimentation that the processor can determine a generation dispatch plan for each generator for each segment of time. Wherein the dispatch plan includes a set of production set points for the plurality of equal portions of time, based on reducing a total of generation dispatch and frequency regulation of each generator within at least one segment of time. The frequency regulation cost is approximated as linear functions of production set points for the portions of time. Wherein the equal lengths of the portions of time define a time resolution of the production time for the dispatch plan. Further, that we can determine a frequency regulation scheme for each generator for each portion of time. Such that the frequency regulation scheme determines a set of production set points for regulating frequency within a predetermined range for each generator due to a variation of the energy production and demand within a corresponding portion of time, which is based on reducing a total frequency regulation cost of each generator for each of a plurality of sections of the corresponding portions of time. Wherein the equal sections of time define a time resolution of the production time for the frequency regulation scheme.

Another aspect we learned is that we can update the unit commitment schedule, the generation dispatch plan and the frequency regulation scheme. This can be accomplished by adjusting the generation dispatch and frequency regulation cost functions for the unit commitment schedule and generation dispatch plan with determined latest production set points, until the mismatch of total costs between two consecutive iterations are less than a pre-determined threshold.

Thus, based on our realizations, energy generation and capacity reserve can be considered through production set points of the generation, while frequency regulation can be considered through sensitivity of the set points to the regulation cost with renewable generation and load variation.

We further realized that the control system can use a transceiver for receiving at each segment of time selected within the production time of the unit commitment schedule, an update on the energy generation of renewable source of energy and the energy consumption of the loads of the PGS. Then, receive at each portion of time selected within the production time of the dispatch plan, an update on the energy generation of renewable source of energy and the energy consumption of the loads of the PGS. Along with receiving, at each section of time selected within the period of time of the frequency regulation scheme, an update on the energy generation of renewable source of energy and the energy consumption of the loads of the PGS. Further still, the control system can use a controller for updating the unit commitment schedule, the generation dispatch plan, and the frequency regulation for each generator. Based on updates on the energy generation of renewable source of energy and the energy consumption of the loads of the PGS, and for causing: (1) the set of generators to maintain an update committed status and produce an updated amount of energy; (2) the loads of the PGS to make an updated load shedding; (3) the generation of renewable source of energy to make an update generation curtailment, according to the updated unit commitment schedule.

Wherein the production time is twenty-four (24) hours, each segment of the production time is an hour, each portion of each segment is five (5) minutes, and each section of each portion is four (4) seconds. Such that the processor can be in communication with a computer readable memory, and stored in the computer readable memory historical data and forecasting data, such that the historical data can include historical profiles for generation outputs of renewable source of energy, historical profiles for loads of the PGS, forecasted profiles for generation outputs of renewable source of energy, forecasted profiles for loads of the PGS, etc. It is contemplated other data along with computer related instructions may be stored in memory.

We further note that when determining a unit commitment schedule of each generator, the cost of generation dispatch and frequency regulation can be expressed as a linear function of production set points for the segments of time for unit commitment schedule based on the sensitivities of dispatch and regulation cost over production set points determined in the generation dispatch plan. Meanwhile, the commitment schedule satisfies the minimum total upward and downward regulation speed requirements for all generators in the PGS, wherein upward regulation speed for a generator in each segment of time is defined as the summation of maximum start-up ramping rate when a generator is starting-up or maximum ramp-up rate when the generator is online for each generator, wherein downward regulation speed for a generator in a segment of time is defined as the summation of maximum shut-down ramping rate when a generator is shutting-down or maximum ramp-down rate when the generator is online. The commitment schedule satisfies relaxed power supply and demand balance constraints for base scenario and a set of sample uncertainty scenarios; wherein the uncertainty scenarios are determined based on the forecasted average values and covariance of load demands and renewable generation of the PGS using unscented transformation techniques.

Further still, we note that when determining a generation dispatch plan of each generator, the cost of frequency regulation is expressed as a linear function of production set points for the portions of time for generation dispatch plan based on the sensitivities of frequency regulation cost over production set points determined in the frequency regulation scheme. Also, when determining a frequency regulation scheme of each generator, the cost of frequency regulation can include the costs related to production set point changes among consecutive sections of time, system frequency deviations from rated frequency, and performance of primary regulation control.

According to an embodiment of the disclosure, a method for power generation system (PGS) estimating energy output and reserve capacity of each generator of a set of generators for a future period of a production time, using an estimation of future generation and consumption of the energy of the PGS for the production time. The method includes producing energy using the set of generators to be later consumed by loads of the PGS. Wherein the set of generators include at least one generator having a controllable energy reserve, and at least one generator that is a renewable source of energy. Using a processor for estimating energy output and reserve capacity of each generator for the future period of the production time using the estimation of future generation and consumption of the energy of the PGS for the production time. Wherein the production of time includes equal lengths of segments of time, each segment of time includes a plurality of equal portions of time, and each equal portion of time includes equal sections of time. Wherein the processor is configured for performing an offline stage by determining an unit commitment schedule of each generator producing an amount of energy and regulating frequency within a predetermined range at each segment of the production time. Based on reducing a total unit commitment, generation dispatch and frequency regulation cost for the set of generators in the PGS, wherein the equal lengths of the segments of time define a time resolution of the production time for the unit commitment schedule. Determining a dispatch plan for each generator, wherein the dispatch plan includes a set of production set points for the plurality of equal portions, based on reducing a total generation dispatch and frequency regulation cost of each generator within at least one segment of time of the production time. Wherein the equal lengths of the portions of time define a time resolution of the production time for the dispatch plan. Determining a frequency regulation scheme for each generator. Wherein the frequency regulation scheme determines generation production adjustments for each generator due to a variation of the energy production and demand within a corresponding portion of time. Based on reducing a total frequency regulation cost of each generator for each of a plurality of sections of the corresponding portions of time. Wherein the equal sections of time define a time resolution of the production time for the frequency regulation scheme. Updating the unit commitment schedule for each generator using the generation production adjustments of the corresponding production and frequency regulation costs over the determined set of production set points in the dispatch plan and frequency regulation scheme. Followed by performing an online stage by using a transceiver in communication with the processor. The transceiver receives at each portion of time selected within the production time of the dispatch plan, an update on the energy generation of renewable source of energy and the energy consumption of the loads of the PGS. Receives, at each section of time selected within the period of time of the frequency regulation scheme, an update on the energy generation of renewable source of energy and the energy consumption of the loads of the PGS. Using a controller in communication with the processor for updating the unit commitment schedule for each generator based on the updates on the energy generation of renewable source of energy and the energy consumption of the loads of the PGS, and for causing the generators to produce an updated amount of energy and maintain required frequency, and for causing the PGS to operate according to the updated unit commitment schedule.

According to another embodiment of the disclosure, a method for non-transitory computer readable storage medium embodied thereon a program executable by a computer for performing a method. The method for power generation system (PGS) estimating energy output and reserve capacity of each generator of a set of generators for a future period of a production time using an estimation of future generation and consumption of the energy of the PGS for the production time. The method including producing energy using the set of generators to be later consumed by loads of the PGS. The set of generators include at least one generator having a controllable energy reserve, and at least one generator that is a renewable source of energy. Using a processor for estimating energy output and reserve capacity of each generator for the future period of the production time using the estimation of future generation and consumption of the energy of the PGS for the production time. Wherein the production of time includes equal lengths of segments of time, each segment of time includes a plurality of equal portions of time, and each equal portion of time includes equal sections of time. Wherein the processor is configured for determining a unit commitment schedule of each generator producing an amount of energy and regulating frequency within a predetermined range at each segment of the production time. Determining a dispatch plan for each generator, wherein the dispatch plan includes a set of production set points for the plurality of equal portions. Determining a frequency regulation scheme for each generator, wherein the frequency regulation scheme determines generation production adjustments for each generator due to a variation of the energy production and demand within a corresponding portion of time. Updating the unit commitment schedule, the generation dispatch plan and the frequency regulation scheme by adjusting the generation dispatch and frequency regulation cost functions for unit commitment schedule and generation dispatch plan with determined latest production set points, until the mismatch of total costs between two consecutive iterations are less than a pre-determined threshold. Using a transceiver in communication with the processor for receiving at each portion of time selected within the production time of the dispatch plan, an update on the energy generation of renewable source of energy and the energy consumption of the loads of the PGS. Receiving, at each section of time selected within the period of time of the frequency regulation scheme, an update on the energy generation of renewable source of energy and the energy consumption of the loads of the PGS. Finally, a controller in communication with the processor for updating the unit commitment schedule for each generator based on updates on the energy generation of renewable source of energy and the energy consumption of the loads of the PGS, and for causing the generators to produce an updated amount of energy and maintain required frequency, and for causing the PGS to operate according to the updated unit commitment schedule.

Further features and advantages of the present disclosure will become more readily apparent from the following detailed description when taken in conjunction with the accompanying Drawing.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

Figure 1A:
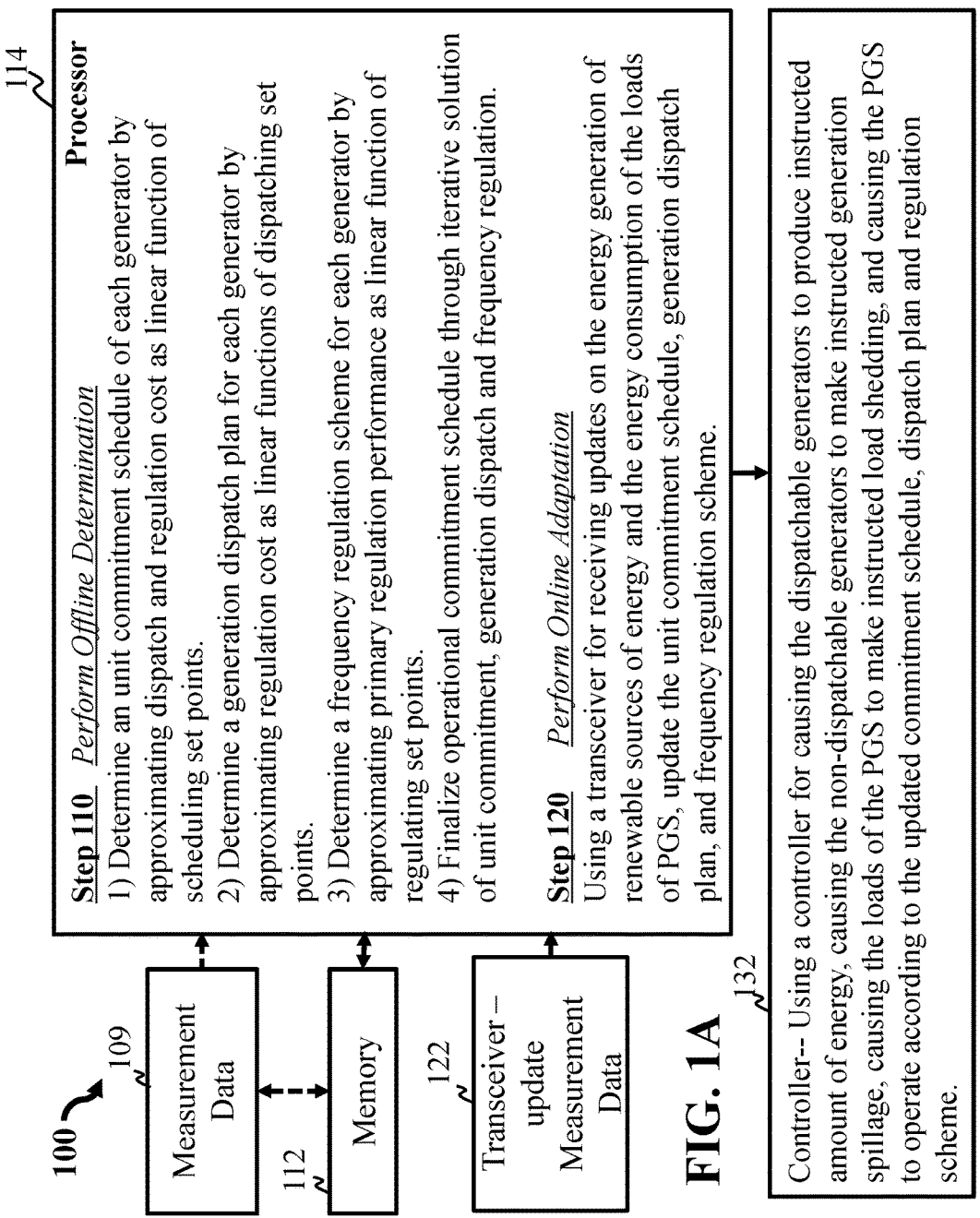
FIG. 1A is a schematic block diagram of co-optimization of energy production and frequency regulation of a power generation system, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

The present disclosure relates to a method to co-optimize the energy production and frequency regulation of a power generation system (PGS). The PGS includes a set of generators for producing energy to be later consumed by loads of the PGS.

In particular, the present disclosure is based on determining how to account for volatility of energy production and consumption for the next energy cycle in determining commitment for their energy generators. We focused on the challenges of addressing the volatility of energy production due to renewable energy sources, along with volatilities due to event driven energy demand in energy consumption. At least one reason to account for these volatilities of energy production and consumption, is that energy providers are required to somehow estimate for the next future upcoming energy cycle, what their expected energy production and consumption is going to be for their energy generators. However, because there are not currently accurate forecasting solutions for the energy providers to estimate their future energy production and consumption for the upcoming energy cycle, the energy providers are left to poor or inefficient energy reserve management. Which leads to over extending the energy provider's generators output capacities and requiring the energy providers to make up for the un-forecasted energy supply (due to the incorrect energy demand/consumption forecasting), by purchasing the energy from third parties and/or from reserve markets at a premium cost. These unplanned expenses, buying energy from third parties along with overextending their generator's capacities, i.e. increased maintenance costs, leads to increase costs that are later passed down to the consumer.

In addressing these challenges, we realized that offline commitment estimation for energy generation and capacity reserve should combine principles of offline forecasting and current online updates. Which will increase the accuracy of the commitment estimation while maintaining the legacy of the current online update.

Specifically, we realized that the energy commitment should be determined on an hourly basis, and updated using forecast of energy generation and consumption determined with the precision of real-time generation dispatch update and further updated with the forecast of energy production and consumption determined with precision of real-time frequency regulation update. In such a manner, offline and online operations are "synchronized". Wherein we discovered through experimentation, a three-level co-optimization model that is used to determine a day-ahead unit commitment schedule considering the impacts of real-time generation dispatch and frequency regulation. Where the generation upward and downward regulation speed constraints are added to represent the system requirements for generation quick responses, and the actual regulation performance is also taken into account through the simulation of primary generation control.

In other words, to better understand the systems and methods of the present disclosure, we can explain more about how we can implement a control system for managing and controlling the PGS. For example, the control system can include a processor, a receiver, and a controller. The processor can be used for estimating energy production and frequency regulation of each generator for a future period of a production time. The processor uses an estimation of future generation and consumption of the energy of the PGS for the production time. Wherein using our realization, we have a production of time that includes equal lengths of segments of time, each segment of time includes a plurality of equal portions of time, and each portion of time includes equal sections of time. The processor can be further configured for determining a unit commitment schedule of each generator. The commitment schedule includes a set of committed statuses, and a set of production set points for each segment of the production time, based on reducing a total of unit commitment, generation dispatch and frequency regulation of each generator. The generation dispatch and frequency regulation cost are approximated as linear functions of production set points for the segments of time. Wherein the equal lengths of the segments of time define a time resolution of the production time for the unit commitment schedule.

Further, the processor can determine a generation dispatch plan for each generator for each segment of time. Wherein the dispatch plan includes a set of production set points for the plurality of equal portions of time, based on reducing a total of generation dispatch and frequency regulation of each generator within at least one segment of time. The frequency regulation cost is approximated as linear functions of production set points for the portions of time. Wherein the equal lengths of the portions of time define a time resolution of the production time for the dispatch plan. Followed by, determining a frequency regulation scheme for each generator for each portion of time. Such that the frequency regulation scheme determines a set of production set points for regulating frequency within a predetermined range for each generator due to a variation of the energy production and demand within a corresponding portion of time, which is based on reducing a total frequency regulation cost of each generator for each of a plurality of sections of the corresponding portions of time. Wherein the equal sections of time define a time resolution of the production time for the frequency regulation scheme.

Then, updating the unit commitment schedule, the generation dispatch plan and the frequency regulation scheme. This can be accomplished by adjusting the generation dispatch and frequency regulation cost functions for the unit commitment schedule and generation dispatch plan with determined latest production set points, until the mismatch of total costs between two consecutive iterations are less than a pre-determined threshold. Further, based on our realizations, energy generation and capacity reserve can be considered through production set points of the generation, while frequency regulation can be considered through sensitivity of the set points to the regulation cost with renewable generation and load variation.

To help get an overall perspective, we will describe at least one method of the present disclosure, by non-limiting example, of an overview of some embodiments. For example, a method for power generation system (PGS) estimating energy output and reserve capacity of each generator of a set of generators for a future period of a production time, using an estimation of future generation and consumption of the energy of the PGS for the production time. The method includes producing energy using the set of generators to be later consumed by loads of the PGS. Wherein the set of generators include at least one generator having a controllable energy reserve, and at least one generator that is a renewable source of energy. Using a processor for estimating energy output and reserve capacity of each generator for the future period of the production time using the estimation of future generation and consumption of the energy of the PGS for the production time. Wherein the production of time includes equal lengths of segments of time, each segment of time includes a plurality of equal portions of time, and each equal portion of time includes equal sections of time. Wherein the processor is configured for performing an offline stage by determining a unit commitment schedule of each generator producing an amount of energy and regulating frequency within a predetermined range at each segment of the production time. Based on reducing a total unit commitment, generation dispatch and frequency regulation cost for the set of generators in the PGS, wherein the equal lengths of the segments of time define a time resolution of the production time for the unit commitment schedule. Determining a dispatch plan for each generator, wherein the dispatch plan includes a set of production set points for the plurality of equal portions, based on reducing a total generation dispatch and frequency regulation cost of each generator within at least one segment of time of the production time. Wherein the equal lengths of the portions of time define a time resolution of the production time for the dispatch plan. Determining a frequency regulation scheme for each generator. Wherein the frequency regulation scheme determines generation production adjustments for each generator due to a variation of the energy production and demand within a corresponding portion of time. Based on reducing a total frequency regulation cost of each generator for each of a plurality of sections of the corresponding portions of time. Wherein the equal sections of time define a time resolution of the production time for the frequency regulation scheme. Updating the unit commitment schedule for each generator using the generation production adjustments of the corresponding production and frequency regulation costs over the determined set of production set points in the dispatch plan and frequency regulation scheme. Followed by performing an online stage by using a transceiver in communication with the processor. The transceiver receives at each portion of time selected within the production time of the dispatch plan, an update on the energy generation of renewable source of energy and the energy consumption of the loads of the PGS. Receives, at each section of time selected within the period of time of the frequency regulation scheme, an update on the energy generation of renewable source of energy and the energy consumption of the loads of the PGS. Using a controller in communication with the processor for updating the unit commitment schedule for each generator based on the updates on the energy generation of renewable source of energy and the energy consumption of the loads of the PGS, and for causing the generators to produce an updated amount of energy and maintain required frequency, and for causing the PGS to operate according to the updated unit commitment schedule.

FIG. 1A is a schematic block diagram of a control system for managing and controlling the energy production and frequency regulation of a power generation system, according to some embodiments of the present disclosure. The control system 100 includes a processor 114, a memory 112, a transceiver 122, and a controller 132. The measurement data 109 can be stored into memory, or send to the processor. The processor can implement the controlling of the PGS with two different steps. The step 110 is performing Offline Determination. This steps includes: determining an unit commitment schedule of each generator by approximating dispatch and regulation cost as linear function of scheduling set points, wherein the time resolution for the segments of time are a set of scheduled intervals of the production time for the commitment schedule; determining a generation dispatch plan for each generator by approximating regulation cost as linear functions of dispatching set points; determining a frequency regulation scheme for each generator by approximating primary regulation performance as linear function of regulating set points; and finalizing unit commitment schedule through iterative solution of unit commitment, generation dispatch and frequency regulation. The step 120 is performing online adaptation. It uses a transceiver 122 for receiving updates on the energy generation of renewable sources of energy and the energy consumption of the loads of the PGS, and communicate with the processor to update the unit commitment schedule, generation dispatch plan, and frequency regulation scheme. The control system 100 uses a controller 132 for causing the dispatchable generators to produce instructed amount of energy, causing the non-dispatchable generators to make instructed generation spillage, causing the loads of the PGS to make instructed load shedding, and causing the PGS to operate according to the updated commitment schedule, dispatch plan and regulation scheme.

According to aspects of the present disclosure, the at least one generator of the set of generators has a controlled energy production, that adjusts energy production to regulate system frequency variation, and the at least one generator is the renewable source of energy and has an uncontrolled energy production except energy curtailment.

Figure 1B:
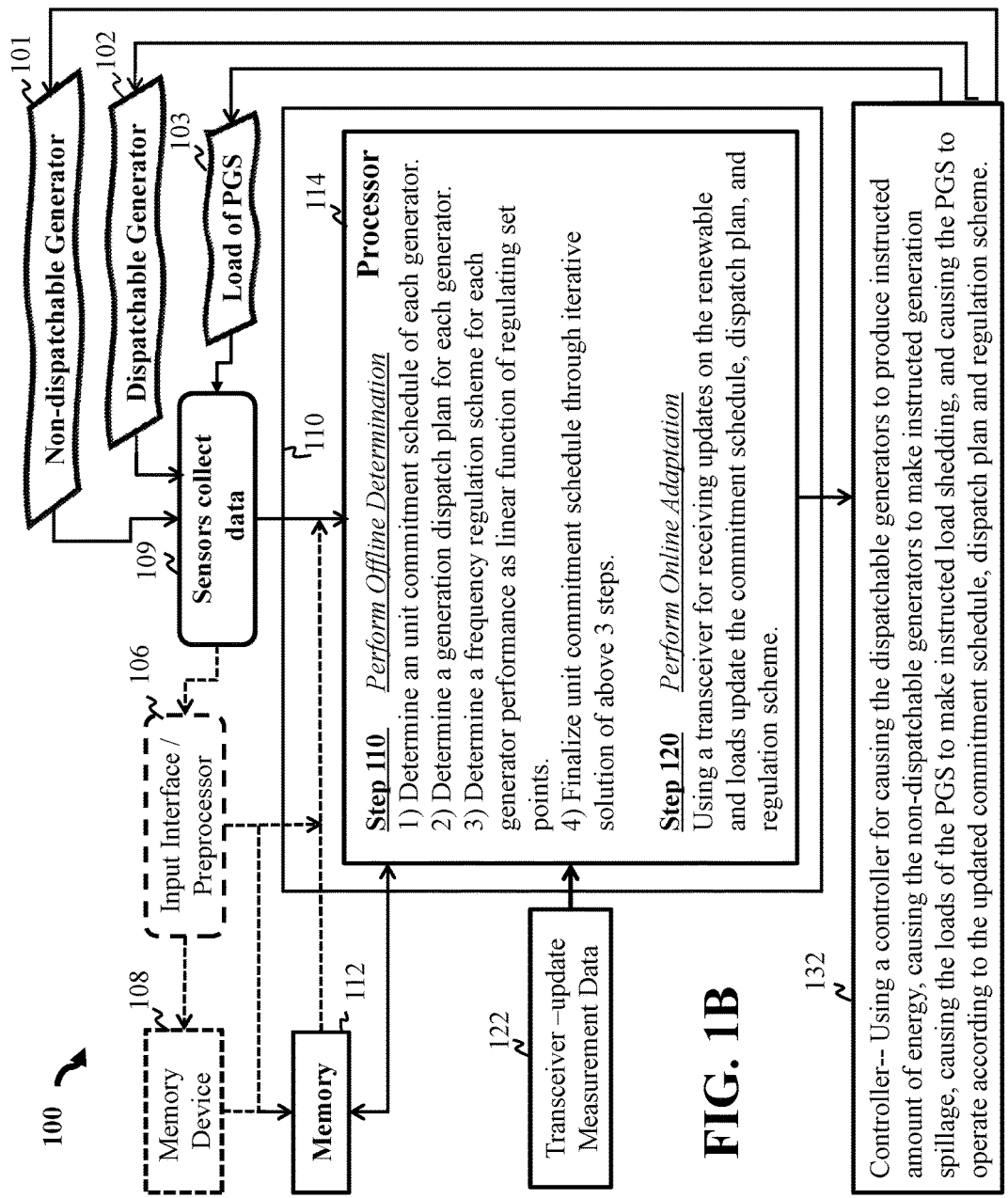
FIG. 1B is an alternative schematic block diagram of co-optimization of energy production and frequency regulation of a power generation system, according to some embodiments of the present disclosure.

FIG. 1B is an alternative schematic of FIG. 1A. It adds sensors 109 that collect data from non-dispatchable generator 101, dispatchable generator 102, and loads 103 of the PGS. The data is sent to memory device 108 through an input interface or preprocessor 106.

Figure 1C:
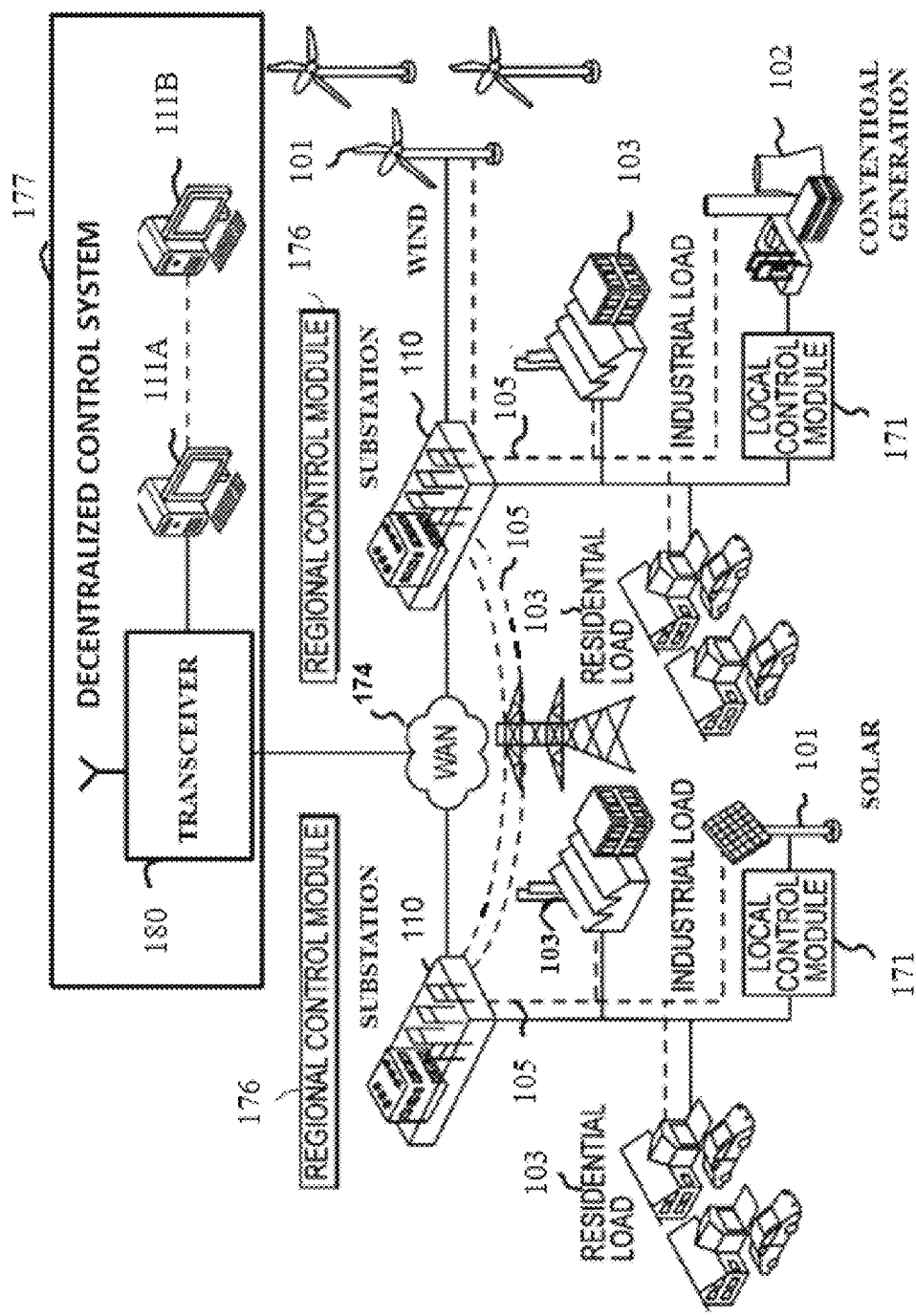
FIG. 1C is a schematic of an exemplar GPS controlled, according to some embodiment of the present disclosure.

FIG. 1C shows a schematic of an exemplar power generation system controlled according to one embodiment of the present disclosure. The conventional power generation facilities 102 are coupled to substations 110 with renewable source of the energy 101 such as wind turbine farms and solar arrays. While FIG. 1C shows three forms of power generation, one skilled in the art will recognize that the present disclosure is applicable to any form of power generation or energy source.

Associated with substations 110 is a regional control module 176. The regional control module manages power production, distribution, and consumption within its region. Also associated with each region are industrial/commercial loads 103 representative of industrial plant or large commercial enterprises and/or residential loads 103. According to some embodiments of the disclosure, each regional control module 176 using one or more applications is operable to manage the power production and distribution within its region. For example, in some embodiments of the disclosure, each regional control module 176 is an independent regional energy operator distributing energy between energy generators and loads located within a corresponding region. In addition to control the electricity within the region, the regional energy operator can supply the excess of the electricity into the grid, or consume needed electricity from the grid. For example, depending on the time of the day, weather conditions, and other circumstances influencing energy production and consumption, the regional energy operator is the energy provider when the energy generators of the region produce more energy than demanded by the loads in the region. Alternatively, the regional energy operator is the energy consumer when the energy generators of the region produce less energy than demanded by the loads in the region. Different energy operators are interconnected with transmission lines 105 (shown in dashed lines).

In some implementations, power-producing entity, such as the power generation plants 102 and the renewable or alternative energy sources 101, interfaces with the regional grid via a local control module 171. The local control module 171 can standardize control command responses with each of the plurality of power providers. By offering to the regional control module 176 a standardized response from each of the plurality of power producing entities, the regional control module can actively manage the power grid in a scalable manner. The regional control module 176 is further aware of the electricity producing capacity within the region and the limitations to the power grid. The regional control module 176 understands topology with respect to the power providers and power consumers and its own ability to distribute the power.

Each regional control module 176 is communicatively coupled to a control system 177 via, e.g., a wide area network 174. The wide area network can be the Internet or other means to communicate data among remote locations. Additionally, or alternatively, the data can be exchanged between the control system 177 and the regional control modules 176 via a local area network or Intranet. To that end, the control system 177 includes a transceiver 180 for exchanging data between the control system and regional control modules 176 via the network 174. Also, control system 177 includes one or several processors 111A and 111B to balance amounts of electricity passing through an electrical grid.

The control system 177 is operable to manage the interaction of several regional control modules 176 and the power providers under their control. As previously described, each regional control module 176 using applicable applications can dynamically manage the power consumers and power providers within its control. As demand within a certain region managed by a regional control module 176 increases or decreases, the regional control module 176 needs to act to compensate for power production within a particular region. To that end, the regional control module 176 makes a decision about supplying or requesting the electricity from the grid. The control system 177 receives, transmits or retransmits such request to balance amount of electricity going in or off the grid.

Different embodiments of the disclosure control one or combination of the power generations of power plants, and the power consumptions of loads in the PGS. For example, one embodiment determines required generation output changes from the updated loads of the PGS and send the generation control commands to the generation controller to drive the system frequency toward a predetermine level. For example, the control system 177 can issue a command to the regional control module 176 to control the generation output levels of dispatchable conventional generation units, or cut the generation outputs of non-dispatchable renewable generations. It is noted that the PGS supplying energy to a geographical area.

Additionally, or alternatively, some embodiments control one or combination of a power generation and a load demand in the PGS. For example, the control system 177 can issue a command to the regional control module 176 to perform a forced load shedding at a bus when system frequency is low than a predetermined threshold.

Figure 1D:
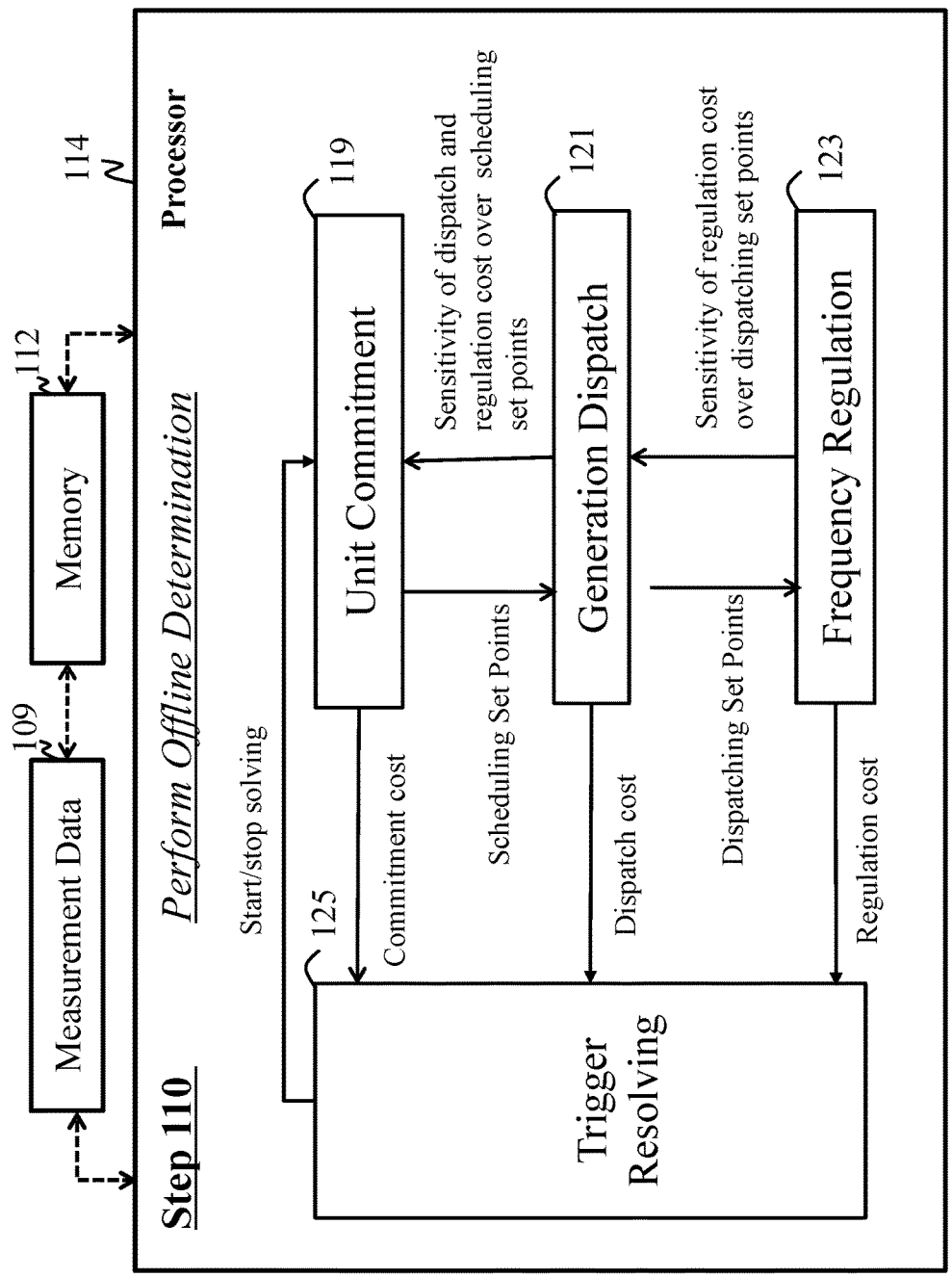
FIG. 1D is a schematic block diagram of performing offline determination stage, according to some embodiments of the present disclosure.

FIG. 1D is a schematic block diagram of performing offline determination task, according to some embodiments of the present disclosure. The offline task includes unit commitment 119, generation dispatch 121, and frequency regulation 123, and triggering resolving 125. The unit commitment 119 determines the unit commitment schedule for all scheduling intervals for the next day. The schedule includes the on/off statuses and scheduling set points in each scheduling interval for each dispatching unit. The scheduling set points are sent to the generation dispatch 121, and the determined commitment cost is sent to trigger resolving 125. The generation dispatch 121 determines the generation dispatch plans for maintaining power balance in all dispatching intervals for each scheduling interval. The dispatch plan includes the dispatching set points for all dispatchable units in each dispatching interval. It also calculates the sensitivities of generation dispatch and frequency cost over scheduling set points and fed back to the unit commitment 119 used for future resolving. The dispatching set points are sent to the frequency regulation 123, and the determined dispatch cost is sent to trigger resolving 125. The frequency regulation 123 determines the generation frequency regulation schemes to maintain required frequency quality in each regulating intervals of all dispatching intervals for next day. It also calculates the sensitivities of frequency cost over dispatching set points and fed back to the generation dispatch 121 prepared for future resolving. The determined regulation cost is sent to trigger resolving 125. The triggering resolving 125 compares the total costs of unit commitment, generation dispatch and frequency regulation to determine whether a resolving cycle is needed.

Figure 1E:
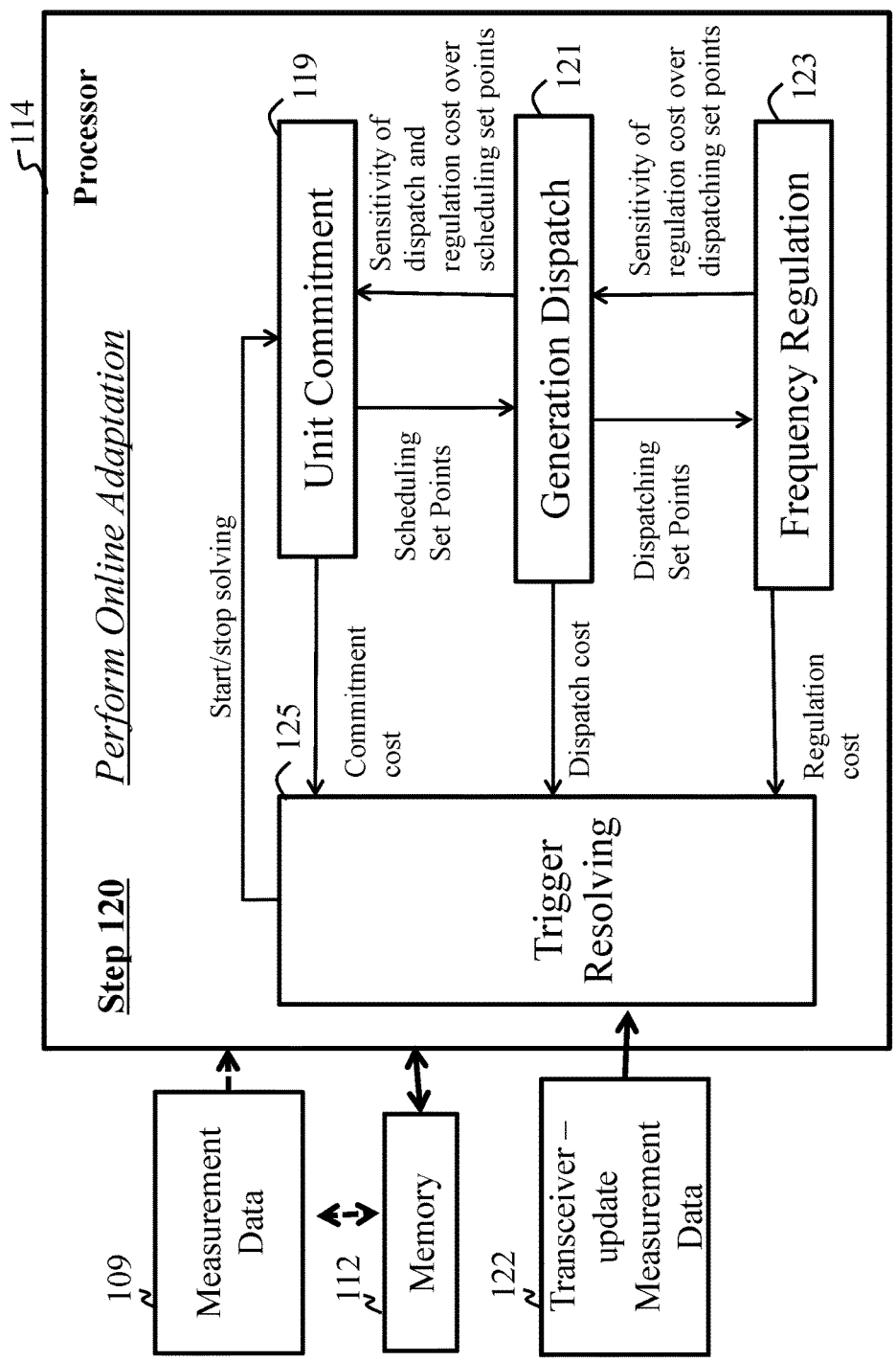
FIG. 1E is a schematic block diagram of performing online adaptation stage, according to some embodiments of the present disclosure.

FIG. 1E is a schematic block diagram of performing online adaptation task, according to some embodiments of the present disclosure. Same as FIG. 1D, the online task is also implemented using 4 components, including unit commitment 119, generation dispatch 121, and frequency regulation 123, and triggering resolving 123. The only difference is the triggering resolving block 123 receives the measurement data update from the transceiver. If the update on the energy generation of renewables and the energy consumption of the loads of the PGS is not ignorable, a new solving cycle is triggered.

Figure 1F:
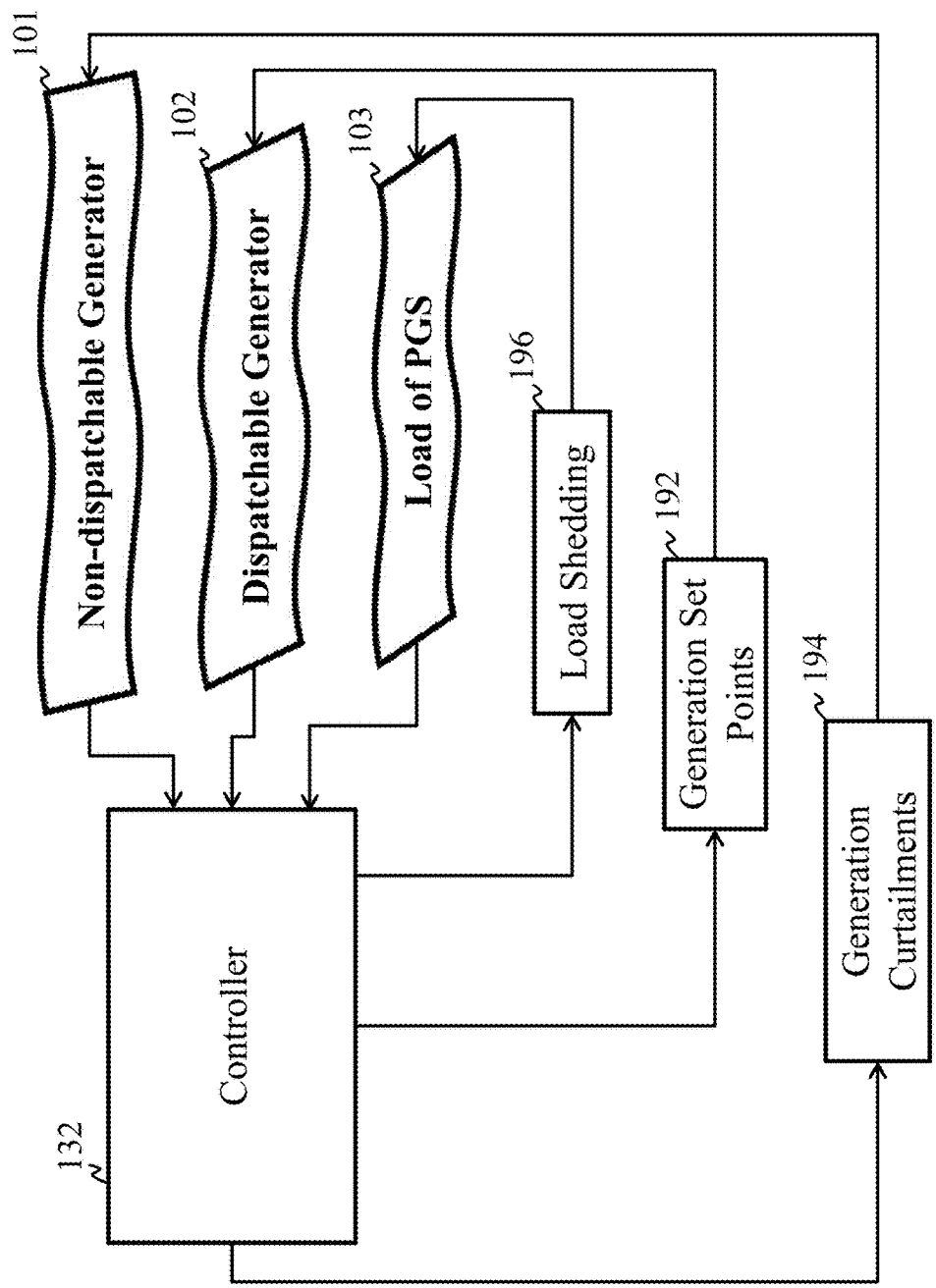
FIG. 1F is a schematic block diagram of using controller, according to some embodiments of the present disclosure.

FIG. 1F is a schematic block diagram of using controller, according to some embodiments of the present disclosure. According to the determined unit commitment schedule, generation dispatch plan and frequency regulation scheme, the controller 132 issues generation on/off status change and generation production set points 192 to the dispatchable generators 102. If the generator is acting for frequency regulation task, the command is updated per regulating interval. If the generator only serves energy production task, the command is updated per dispatch interval. The controller also sends the generation curtailment commands 194 to the non-dispatchable generators 101, and load shedding commands 196 to the loads of the GPS 103. The generators 101 and 102, and the loads 103 will send back the results for their command following to the controller 132.

The present disclosure can be used for managing a day-ahead power market. Participants in this market are generation plants that seek to recover their operation and regulation costs, electricity consumers who seek to procure electric energy for their needs, and independent system operators who act on behalf of generation plants and electricity consumers, maximizing the utility of electricity consumers while minimizing the cost of generation plants.

Figure 2A:
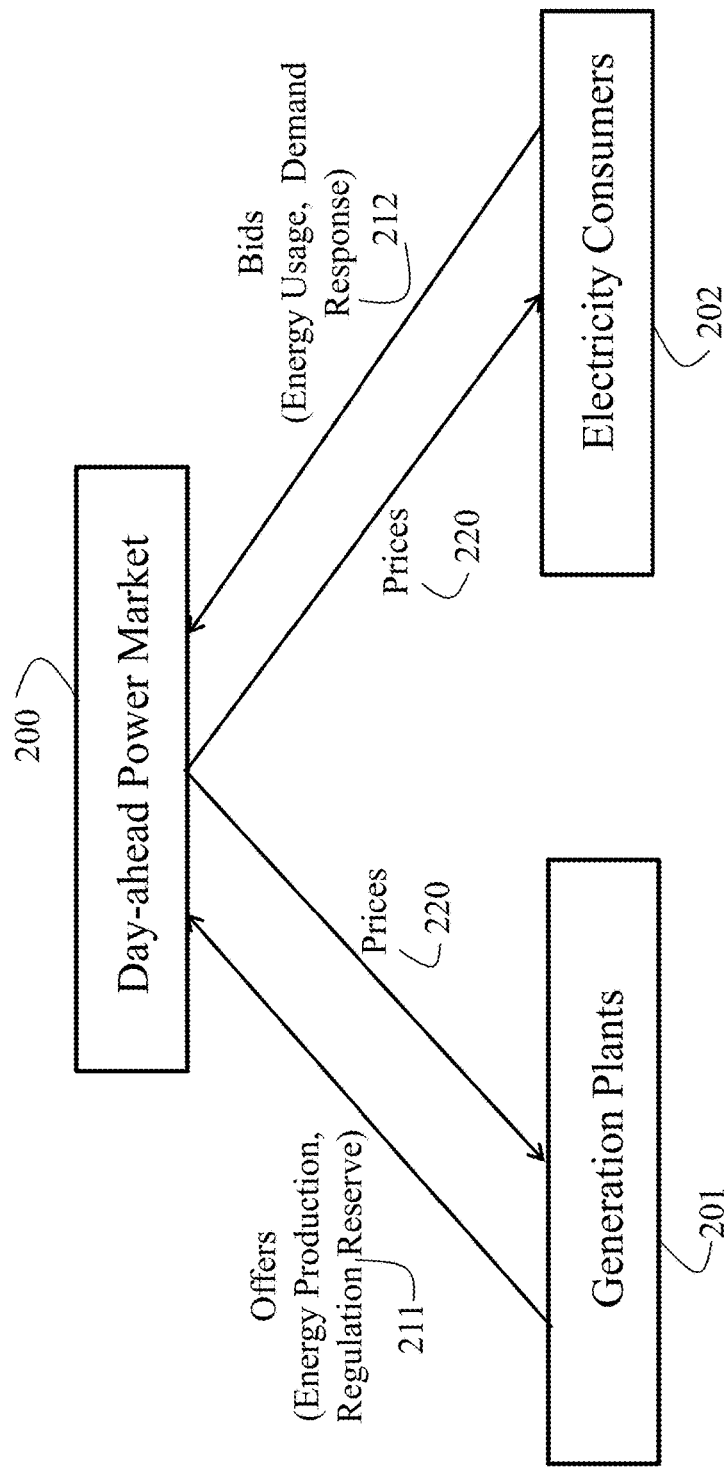
FIG. 2A is a schematic for a day-ahead power market, according to some embodiments of the present disclosure.

As shown in FIG. 2A, the day-ahead power market, 220 will accept the offers 211 from generation plants 201 on energy production and regulation reserves, and bids 212 from electricity consumers 202 on energy usages and demand responses, and send back a set of prices 220 to the generation plants and electricity consumers to adjust their offers and bids. This process iterates until a converged offer-bid and price is achieved.

Figure 2B:
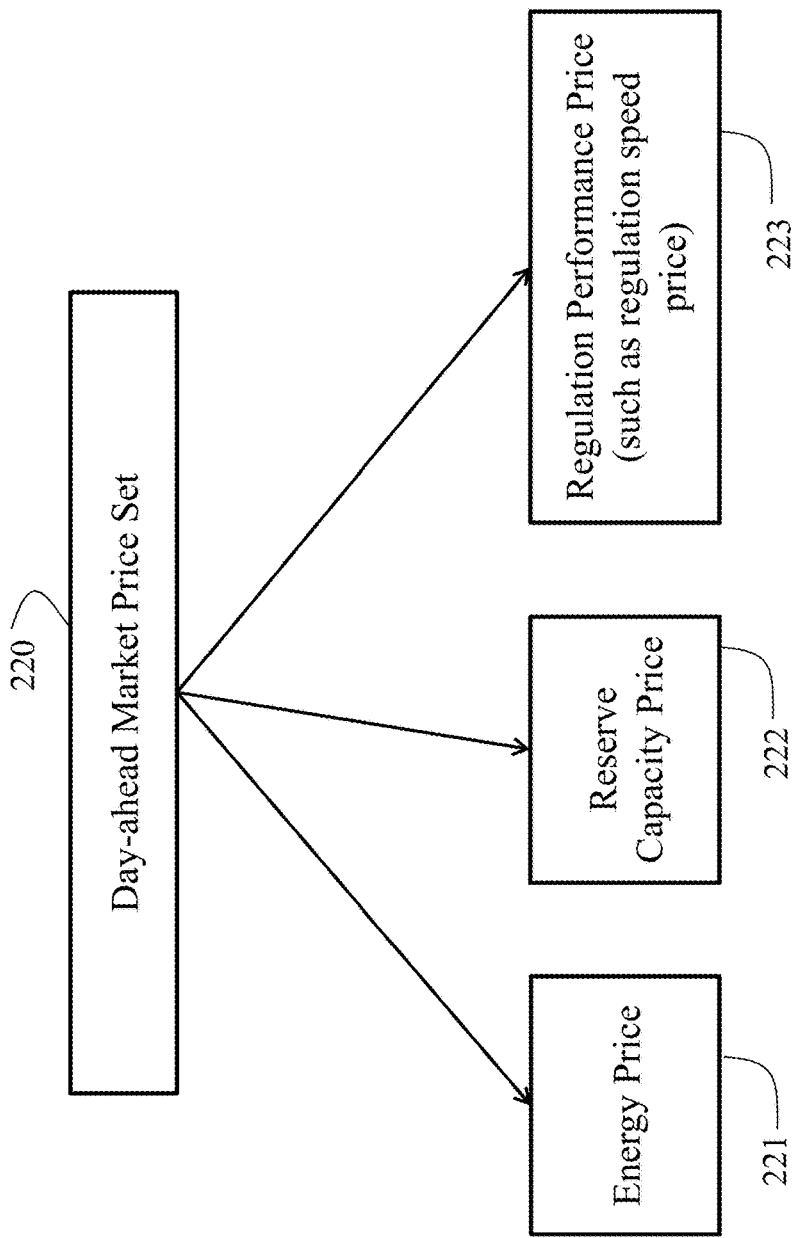
FIG. 2B is a schematic for the components of price sets for a day-ahead market, according to some embodiments of the present disclosure.

As demonstrated in FIG. 2B, the price set 220 used in day-ahead market includes three components, energy price 221, reserve capacity price 222, and reserve performance price 223, which is represented as regulation speed price.

The energy production and regulation reserves are co-optimized in the day-ahead market with uncertain renewable generations and uncertain load demands. The generation units are divided into two groups, one is the dispatchable generation units that can perform energy production and reserve regulation tasks, and the other one is the non-dispatchable generation units, such as renewable units that can only be used as constant powers. According to the needs of system power balance, renewable curtailment and load shedding energy can also be used, but charged with certain penalty costs.

Figure 2C:
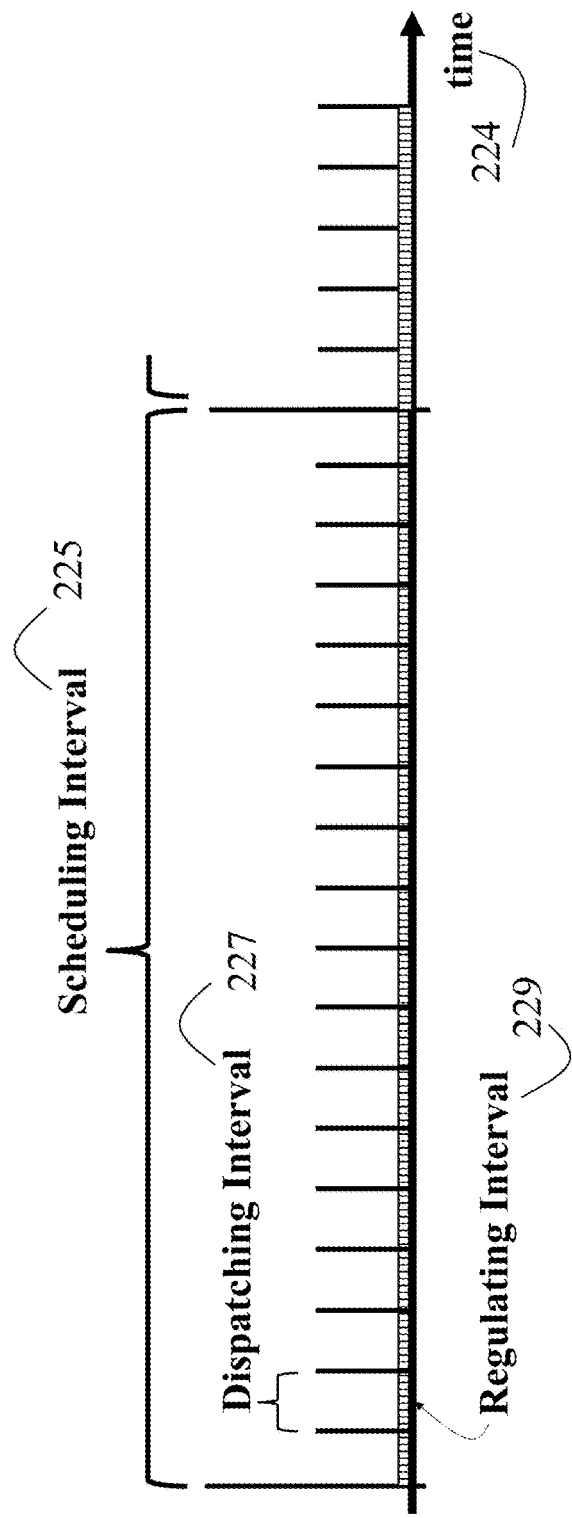
FIG. 2C is a diagram for production time partitioning into scheduling, dispatching and regulating intervals, according to some embodiments of the present disclosure.

For each day-ahead operation cycle, the entire period (e.g. 24 hours) is partitioned into small sections using three different scales as shown in FIG. 2C. The total period 224 is first divided a set of equal scheduling intervals 225 (e.g. 1 hour for each scheduling interval). Each scheduling interval is then divided into a set of equal dispatching intervals 227 (e.g. 5 minutes for each dispatching interval). Each dispatching interval is further divided into a set of equal regulating intervals 229 (e.g. 4 seconds for each regulating interval).

Figure 2D:
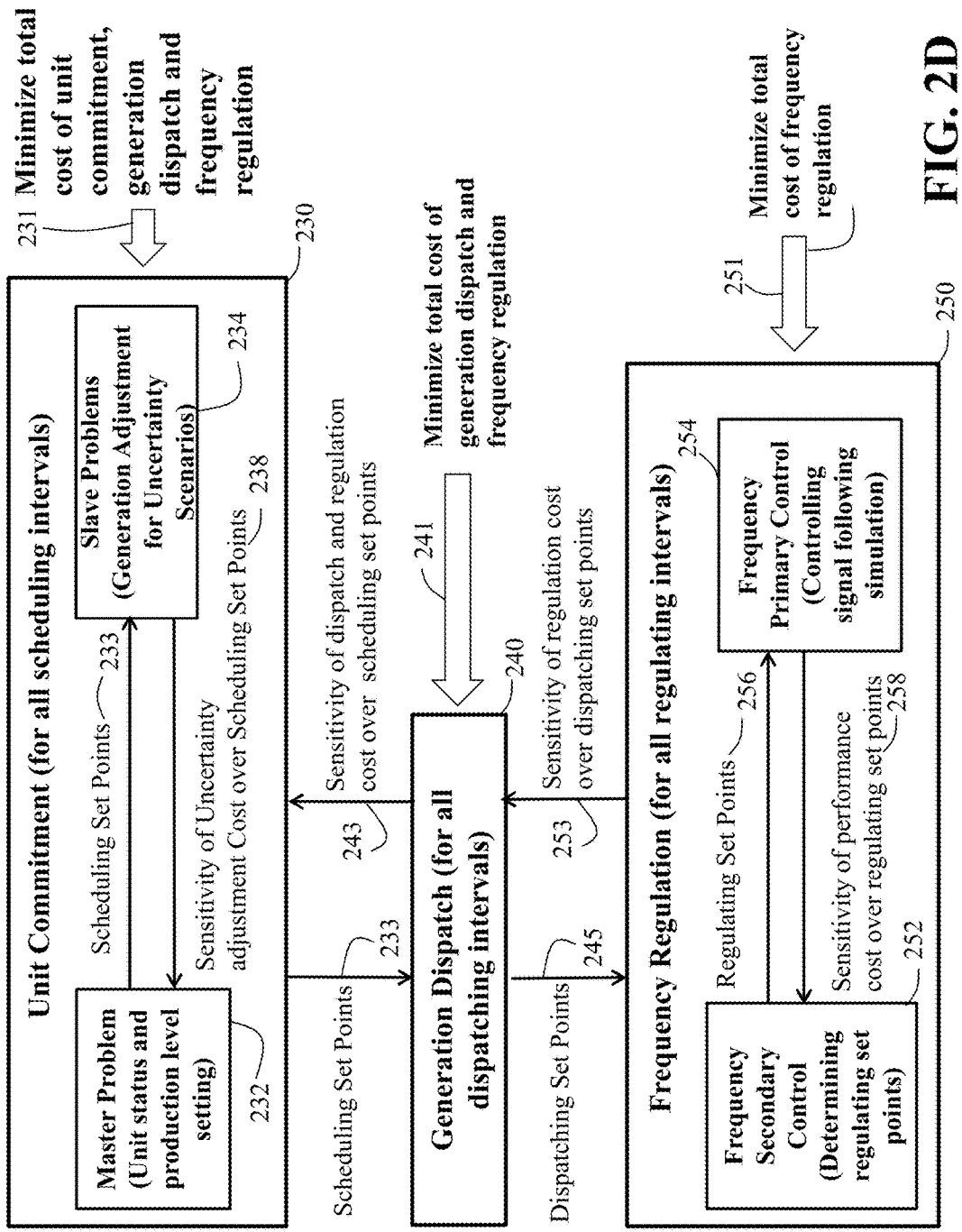
FIG. 2D is a schematic for relationship between unit commitment, generation dispatch and frequency regulation, according to some embodiments of the present disclosure.

The co-optimization is achieved through a three-level optimization process as shown in FIG. 2D, including unit commitment 230, generation dispatch 240, and frequency regulation 250.

The first level of co-optimization 230 is to determine the unit commitment schedule for all scheduling intervals for the next day. The schedule includes the on/off statuses and scheduling set points 233 in each scheduling interval for each dispatching unit. The unit commitment schedule may also include renewable curtailments for all renewable units, and load shedding for all loads in each scheduling interval. The scheduling set points 233 define average generation production levels for each dispatchable unit under the base scenario which was defined by the forecasted day-ahead loads and renewable generations for each scheduling interval. The objective of the first level 231 is to minimize the total cost of unit commitment, and the additional cost related to generation dispatch and frequency regulation which was expressed as a linear function of scheduling set points based on the sensitivities of generation dispatch and frequency regulation cost over scheduling set points received from the second level. The determined scheduling set points are sent to the second level to serve as bases for determining detailed generation dispatch plan for each dispatching interval. The first level is decoupled into a master problem 232 and a set of slave problems 234. The objective of the master problem 232 is to determine the unit on/off statues and scheduling set points for base scenarios by minimizing the total cost of unit commitment for base scenarios, weighted additional generation adjustment costs related to uncertainty scenarios, and linearized dispatch and regulation cost under constraints the base scenario based system-wide constraints, and generating unit-wise constraints. The additional generation adjustment cost related to each uncertainty scenario is expressed as a linear function of scheduling set points based on the sensitivities of additional generation adjustment cost over scheduling set points 238 received from the slave problem 234 corresponding to the uncertainty scenario. The slave problem 234 exchanges the scheduling set points 233 with the master problem 232 to adjust generation productions to meet the power balance needs for the uncertainty scenario under study. The sample uncertainty scenarios are selected using unscented transformation technique based on the forecasted/historical means and covariance of renewables and loads in the system.

The second level of co-optimization 240 is to determine the generation dispatch plans for maintaining power balance in all dispatching intervals for each scheduling interval. The dispatch plan includes the dispatching set points 245 for all dispatchable units in each dispatching interval. It can also include renewable curtailments and load shedding in each scheduling interval if required. The objective of the second level 241 is to minimize the total cost of generation dispatch, and additional frequency regulation cost that was represented as a linear function of dispatching set points based on the sensitivities of regulation cost over dispatching set points 253 received from the third level. The dispatching set points 245 define the average generation production levels for each dispatching interval if the generation unit acted as source for both energy production and frequency regulation. If only acting for energy production, the generation unit maintains its production at the set point level during the period of dispatching level. The second level sends the dispatching set points to the third level that used as bases for determining the frequency regulation schemes.

The third level of co-optimization 250 is to determine the generation frequency regulation schemes to maintain required frequency quality in each regulating intervals of all dispatching intervals for next day. The regulation scheme includes the regulating set points 256 for all dispatchable units in each regulating interval. The objective of the third level 251 is to minimize the additional cost related to frequency regulation, including cost related to secondary control 252 for adjusting regulating set points, and performance of generation primary controller 254 to follow the regulating set points that expressed as a linear function of regulating set points based on the sensitives of performance cost over regulating set points 258 determined by signal following simulation of the primary controller.

For practical applications, the procedure described in FIG. 2D can be implemented in both static and dynamic manners. For the static implementation, with given load and renewable profiles for three different time scales, a set of unit commitment schedule, generation dispatch plan, and frequency regulation schedule can be determined through one-time iterative co-optimization. The solved schedule, plan and schemes then can be used for the entire period of next day-ahead production time.

For the dynamic implementation, the solution determined by the static implementation can be served as an initial start point. The solution will be updated by triggering a new solution for co-optimization when any of load profiles or renewable profiles at any time scales are changed. The dynamic implementation enables the unit commitment schedule more closely matching the real-time situations, and then minimize the gaps between day-ahead market and real-time market and maximize the economic efficiency of power generation systems.

In a day-ahead market, no matter what time scale is used, the security of power system must be guaranteed for each time interval. The DC power flow is used to simulate the security requirements for the power system.

Figure 2E:
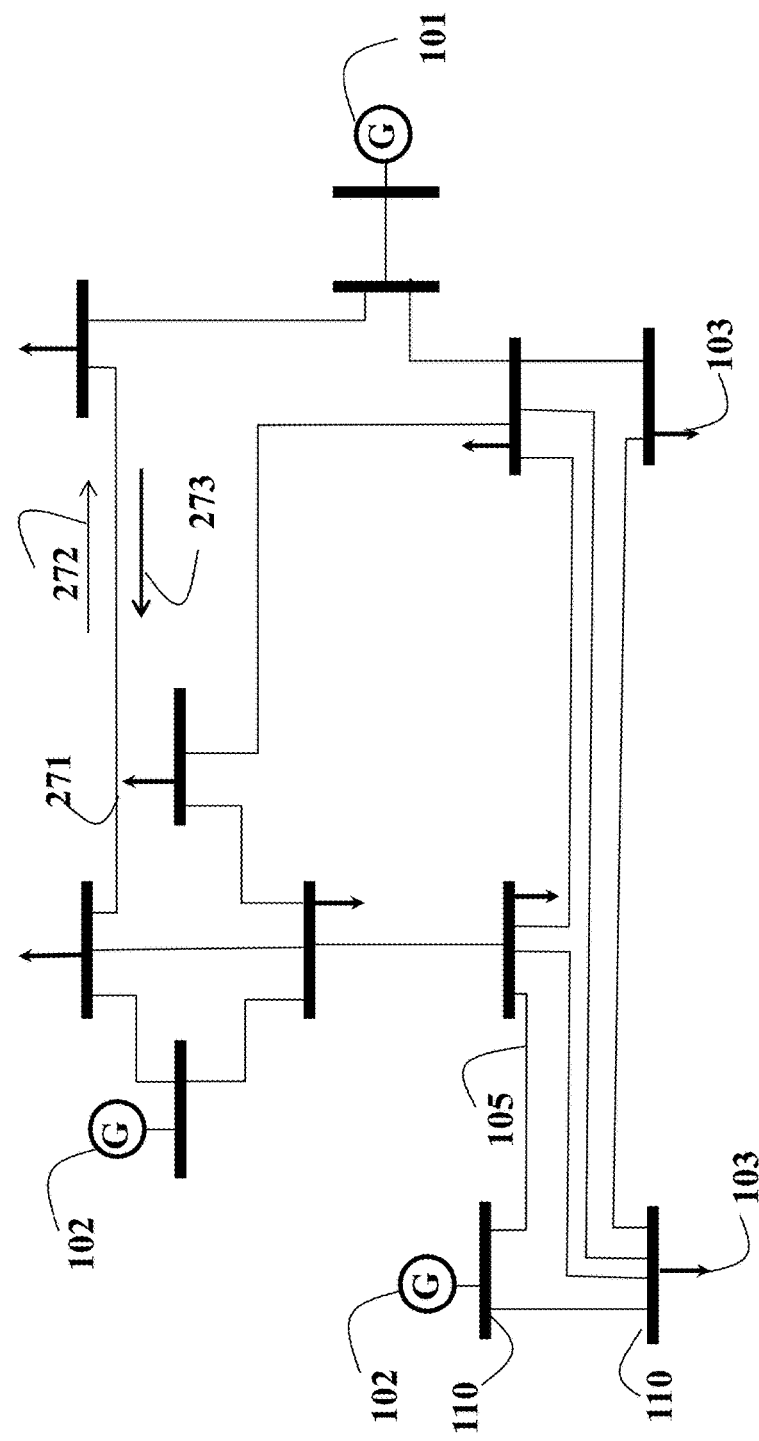
FIG. 2E is a diagram for an example of power systems, according to some embodiments of the present disclosure.

FIG. 2E is a diagram for an example of power generation systems. The power generation system includes a set of bus 110. A generation unit 101, 102 or a load 103 can be connected to a bus. The power generations may be contributed from a dispatchable generation unit 102, or a non-dispatchable unit 101. A transmission line 271 is connected with two buses, and power flows on the line can be measured from two different directions: positive direction 272, and negative direction 273.

The security of power system is achieved by constraining the power flow at both positive and negative directions on each transmission line within its maximum capacity. The allocation factors are used to represent the power flow of a transmission line as a linear combination of generation outputs and load demands. In order to reduce the computation burden, an iterative solution method is used for handling power flow capacity constraints. During the iterations, a power flow is first triggered, and then only the constraints corresponding to overload lines are added into the problem and obtained a new solution. This process is iterated until there is no overload existing.

Uncertainty Modeling

As the penetration of renewable generation increases, the operational reserves becomes more and more important, because the generating units must be able to achieve the power balance in any moment without compromising the system security. Renewable energy is subject to a high variability and the uncertainty related to renewable sources makes it difficult to get an accurate forecast, so that, the conventional dispatchable units have to work more flexibly.

Figure 3A:
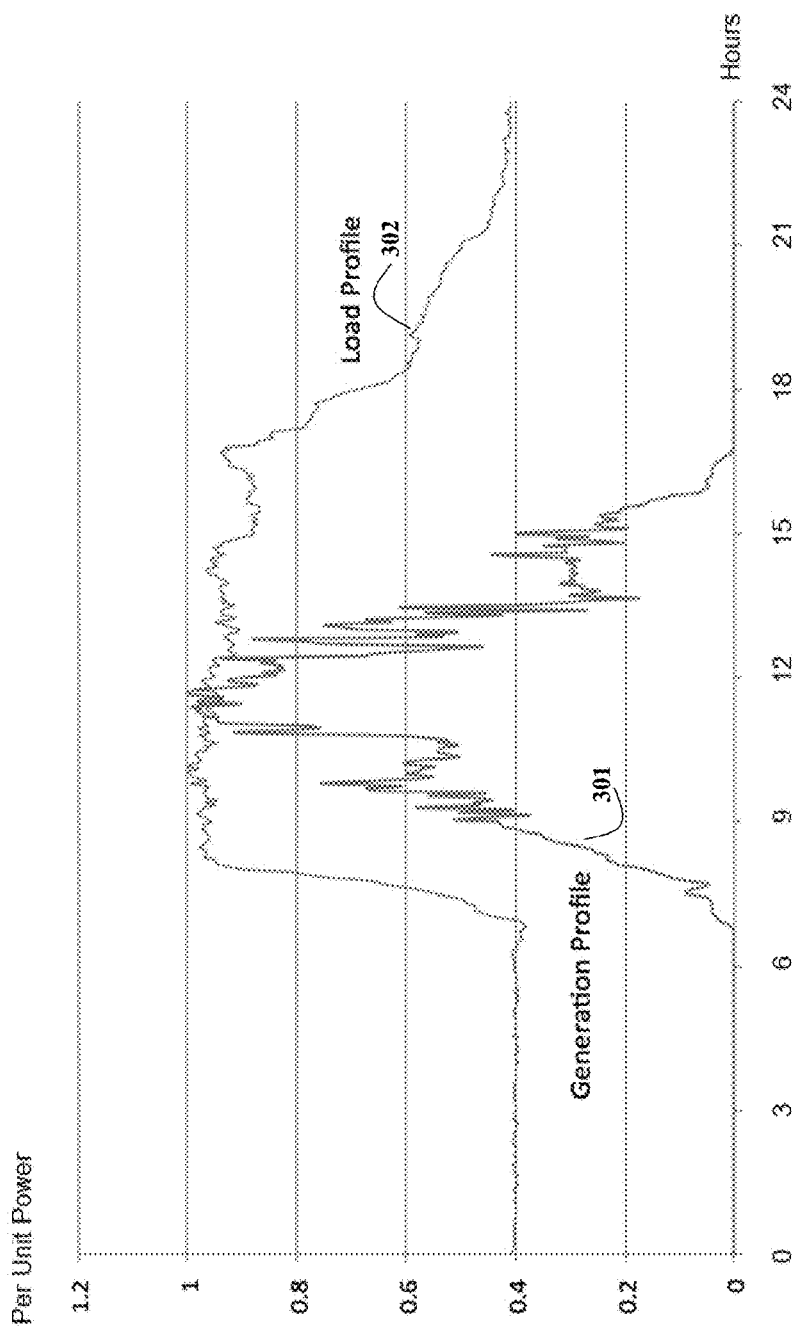
FIG. 3A is a schematic for typical renewable generation profile and load profile, according to some embodiments of the present disclosure.

FIG. 3A is an example of renewable generation profile 301 and load profile 302. It can be seen that the magnitudes of renewable generations and load demands can be varied significantly over the period of 24 hours.

Figure 3B:
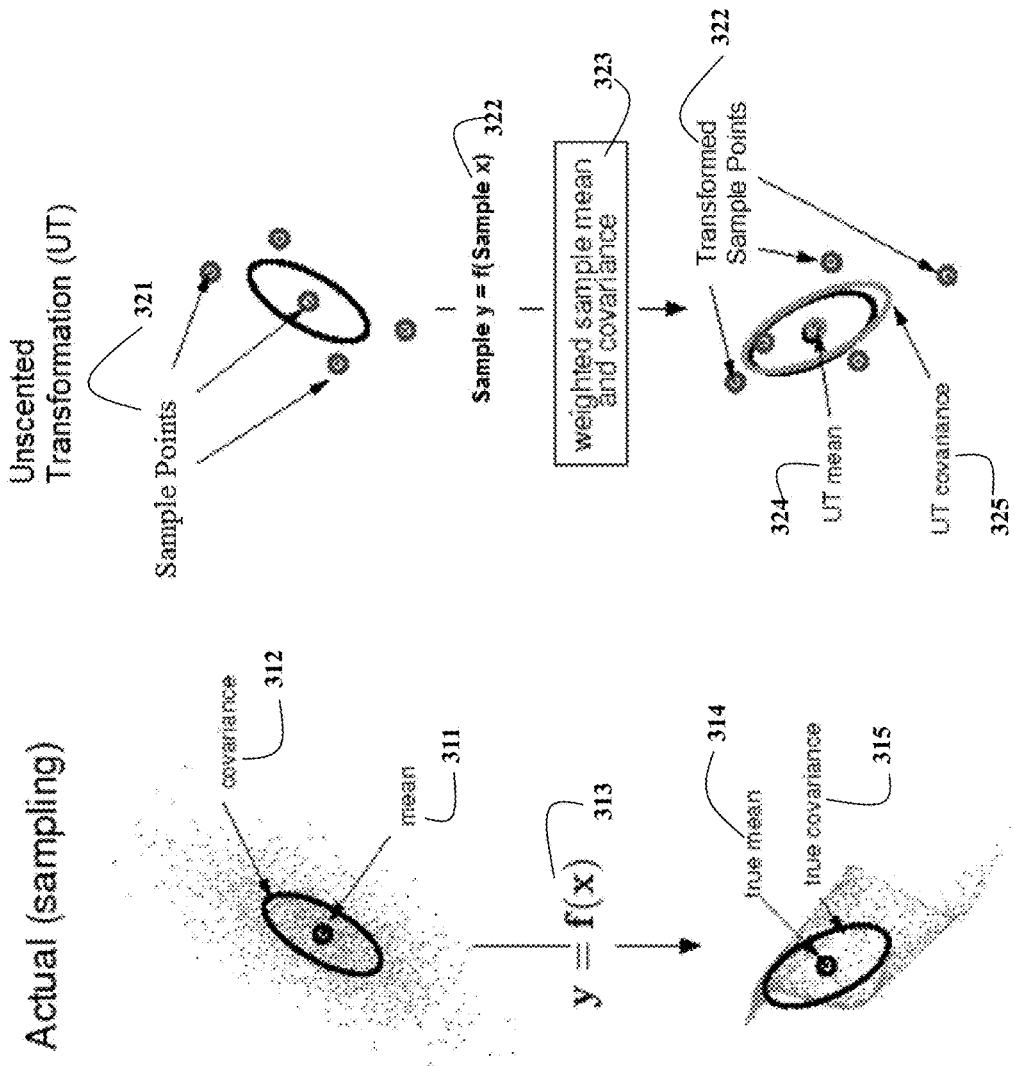
FIG. 3B is a schematic for unscented transformation of a random variable and its function, according to some embodiments of the present disclosure.

In order to take the uncertainties of renewables and load demands into consideration, we use a set of scenarios that generated based on unscented transformation technique. The unscented transform is used to estimate the result of applying a given nonlinear transformation to a probability distribution that is characterized only in terms of a finite set of statistics. FIG. 3B is a schematic for unscented transformation of a random variable with Gaussian distribution (described by its mean 311 and covariance 312) and its function 313 (described by its mean 314 and covariance 315). In order to determine the unscented transformation of a function of random variables with Gaussian distribution, the random distribution of the variables is first expressed a set of sample points 321. Then the associated sample points for the function 322 are determined using the sampling points. The means and covariance of the function, 324 and 325 are calculated based on those associated sample points.

Assumed $P_t$ is the vector of bus net power injections contributed by renewable sources or load demands at time interval t, and follows the Gaussian distribution:

$$P_t \sim N(\hat{P}_t, Q_t) \quad (1)$$

where $\hat{P}_t$ and $Q_t$ is the vector and matrix of means and covariance for $P_t$ at time interval t. A set of scenarios, $\tilde{P}_t$ can be created by using a set of (2 n+1) sample points defined as follows:

$$\tilde{P}_t = [\hat{P}_t \ldots \hat{P}_t] + \sqrt{n+\lambda}[0\sqrt{Q_t} - \sqrt{Q_t}] \quad (2)$$

where, n is the dimension of bus power injection variables, $\lambda$ is the parameters that determine the spread of the sample points around. The square root of the covariance matrix, $\sqrt{Q_t}$, can be solved using the Cholesky factorization method. If a variable $Y_t$ is associated with $P_t$ according to:

$$Y_t = f(P_t) \quad (3)$$

Its mean vector, $\hat{Y}_t$ and covariance matrix $Q_{Y_t}$ can be determined based on the sample points of $\tilde{P}_t$ according to:

$$\hat{Y}_t = \sum_{k=0}^{2n} W_k \tilde{Y}_{t,k} \quad (4)$$

$$Q_{Y_t} = \sum_{k=0}^{2n} W_k \left[ (\tilde{Y}_{t,k} - \hat{Y}_t)(\tilde{Y}_{t,k} - \hat{Y}_t)^T \right] \quad (5)$$

$$\tilde{Y}_{t,k} = f(\tilde{P}_{t,k}) \quad (6)$$

where, $W_0 = \lambda/(n+\lambda)$, $W_k = 0.5/(n+\lambda)$. If we set $\lambda$ as zero, the calculation need not including the sample point corresponding to the mean values.

For each scheduling interval h, if the number of buses with non-zero power injections determined by connected renewables or loads is $n_h$, the impacts of uncertain loads and uncertain renewables on the system can be represented by $K_h$ uncertainty scenarios for renewables and loads, $K_h = (2n_h+1)$. Those uncertainty scenarios are determined based on the forecasted renewables and loads, and covariance matrix between $n_h$ non-zero net injections for the scheduling interval h according to Equation (2).

The expected behaviors or attributes of the system under uncertain load and renewable can be represented using the weighted sum of corresponding behavior or attribute evaluated for each individual sample uncertainty scenario according to Equations (4) and (5). For example, if we want to get the expected load shedding and renewable curtailment cost for the system, we can first determine the load shedding and renewable curtailment cost under each uncertainty scenario, and then the expected cost for the system can be determined as weighted summation of corresponding costs for all uncertainty scenarios.

In the present disclosure, we treat the base scenario calculation corresponding to the scenario that loads and renewables are kept as forecasted values and the uncertainty scenario that loads and renewables are away from the forecasted values separately. For the base scenario, its cost is fully taken into the total cost when performing co-optimization. As for the non-base uncertainty scenarios, its cost is weighted by corresponding weight factor to be considered into the total cost. For this consideration, the present disclosure sets $\lambda$ as zero, and then the weight corresponding to base scenario is zero, i.e. $W_{h,0}=0$. The weight factor for non-base uncertainty scenario k in scheduling interval h, $W_{h,k}$ is determined as: $W_{h,k}=0.5/n_h$.

Figure 3C:
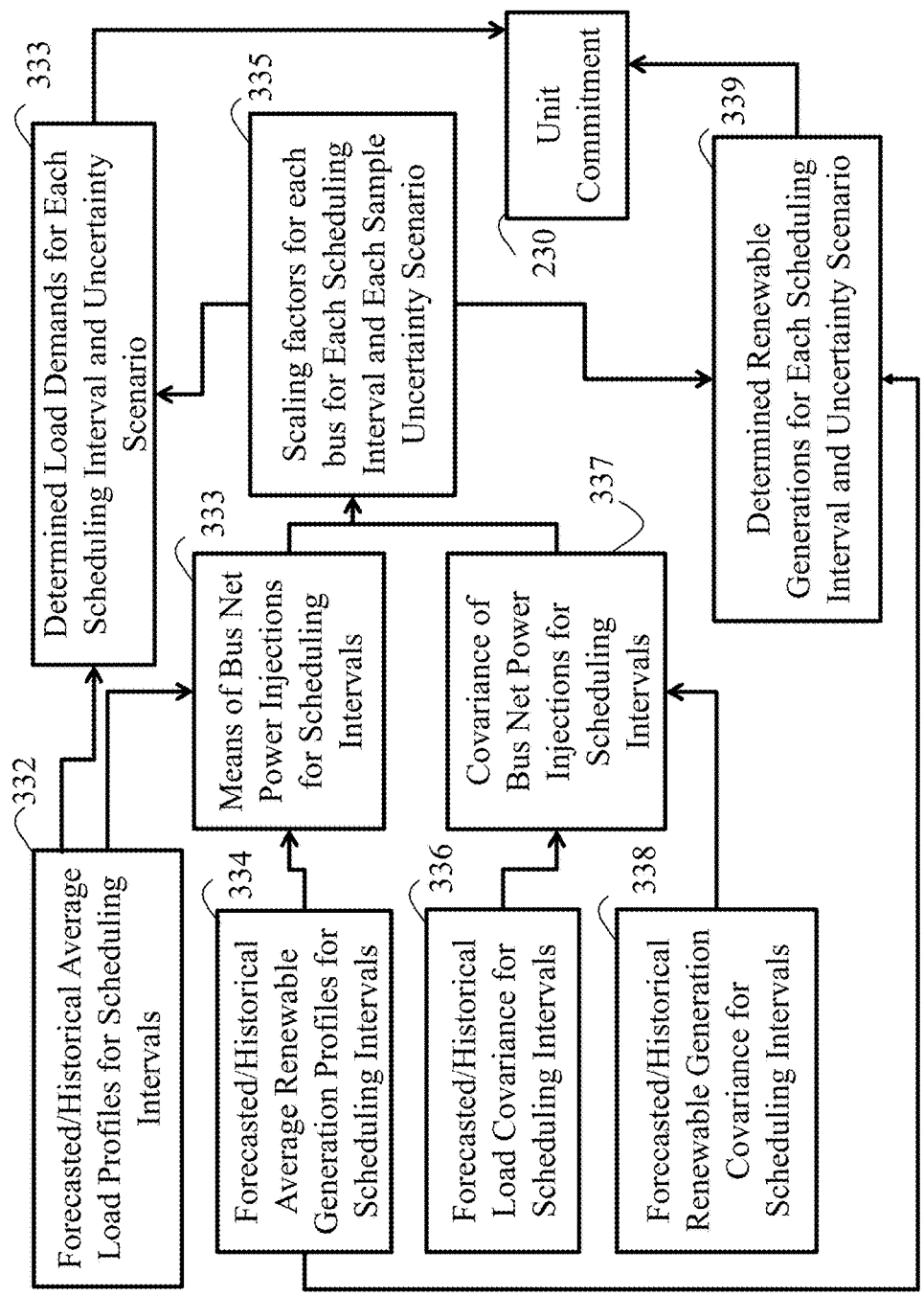
FIG. 3C is a schematic for generating renewable generation and load demand profiles for scheduling intervals, according to some embodiments of the present disclosure.

During the process of co-optimization, three different load and renewable profiles are required. For the determination of unit commitment schedule, the load and renewable profiles have to be given for each scheduling interval. FIG. 3C gives a schematic for generating renewable generation and load demand profiles for scheduling intervals. For the buses that connected with renewables or loads, a vector of average bus net power injections for each scheduling hour h, 333 is calculated based on the vectors of forecasted/historical load demand 332, or renewable generations 334, and a covariance matrix of bus net power injections for scheduling hour h, 337 is calculated based on the forecasted/historical covariance matrices of load demand 336, or renewable generations 338. The unscented transformation is then used to get sample points to represent the distribution of bus net power injections caused by load and renewable uncertainty, and a set of scaling factors corresponding to different sample points can be determined for each bus in the scheduling hour h accordingly. Using those scaling factors 335, and the forecasted/historical loads 332 or renewable generations 334, the load demands and renewable generations required by the unit commitment problem 230, 333 and 339 can be obtained.

The load demand of load d and renewable generation of renewable unit r in scheduling interval h under uncertainty scenario k, $P_{dh,k}$ and $P_{rh,k}$ can be determined according to:

$$P_{dh,k} = P_{dh} \text{SCALE}_{dh,k} \quad (7)$$

$$P_{rh,k} = P_{rh} \text{SCALE}_{rh,k} \quad (8)$$

$P_{dh}$ and $P_{rh}$ are the forecasted load demand of load d and renewable generation of renewable unit r in scheduling interval h. $\text{SCALE}_{dh,k}$ and $\text{SCALE}_{rh,k}$ are the scaling factors corresponding to the buses connected to load d and renewable unit r determined as the ratio of the net power injection at corresponding bus for k-th uncertainty scenario of scheduling interval h over the mean of net power injection at the same bus and same scheduling hour h.

Figure 3D:
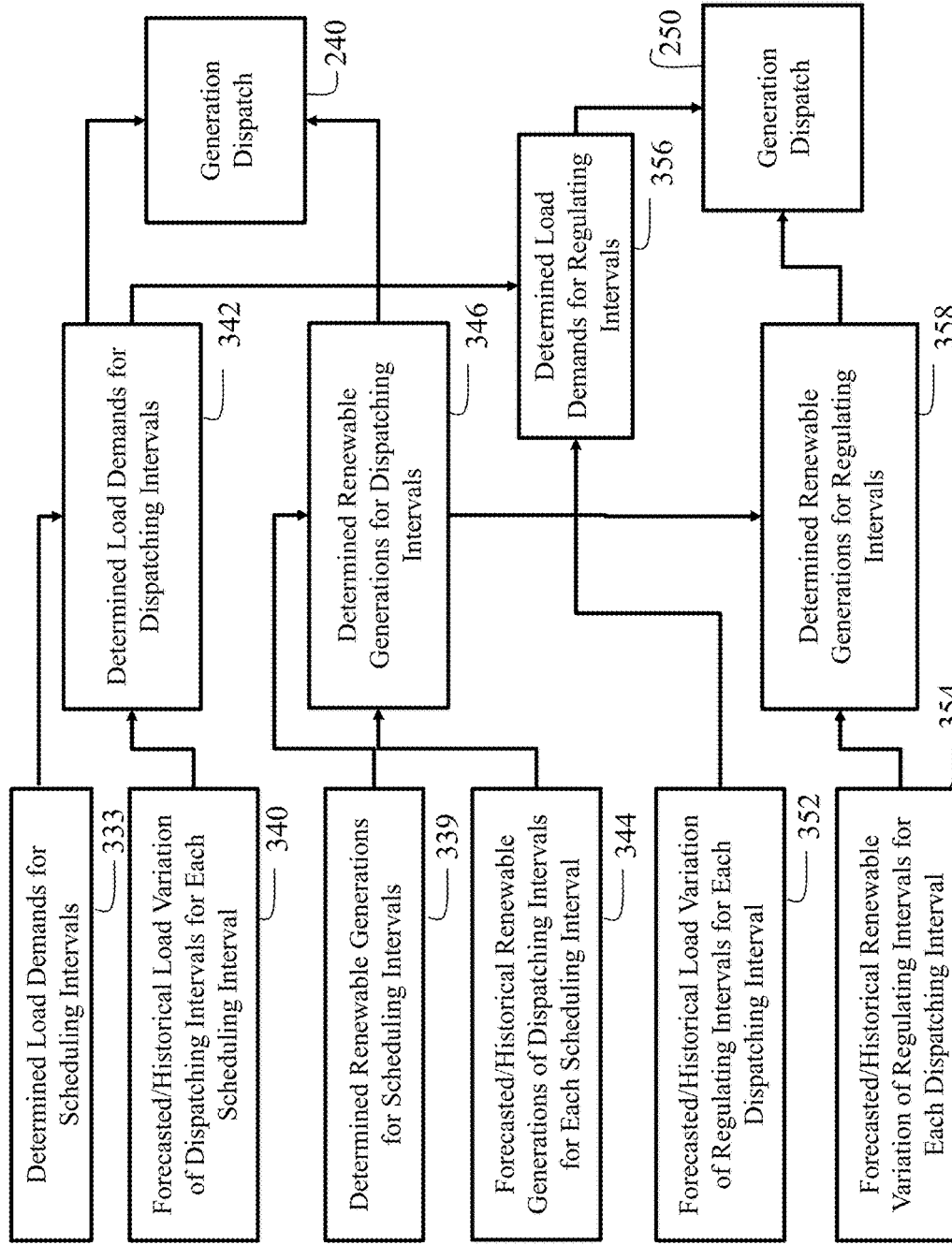
FIG. 3D is a schematic for generating renewable generation and load demand profiles for dispatching and regulating intervals, according to some embodiments of the present disclosure.

As for the tasks of generation dispatch and frequency regulation, the load and renewable profiles for each dispatching interval and regulating interval are required. FIG. 3D gives a schematic for generating renewable generation and load demand profiles for dispatching and regulating intervals. The load demands for dispatching intervals 342 can be determined based on the determined load demands in the corresponding scheduling interval for the dispatching intervals 333 and historical/forecasted load demand fluctuation in the dispatching interval around the average value for the corresponding scheduling interval 340. Similarly, the renewable generations for dispatching intervals 346 can be determined based on the determined renewable generations in the corresponding scheduling interval for the dispatching intervals 339 and historical/forecasted renewable generation fluctuation in the dispatching interval around the average value for the corresponding scheduling interval 344. The determined load demands and renewable generations are fed to the generation dispatch problem 240 for making dispatching decisions.

Meanwhile, those data can be further used to generate load demands and renewable generations for the frequency regulation problem 250. The load demands for regulating intervals 356 can be determined based on the determined load demands in the corresponding dispatching interval for the regulating intervals 342 and historical/forecasted load demand fluctuation in the regulating interval around the average value for the corresponding dispatching interval 352. Similarly, the renewable generations for regulating intervals 358 can be determined based on the determined renewable generations in the corresponding dispatching interval for the regulating intervals 346 and historical/forecasted renewable generation fluctuation in the regulating interval around the average value for the corresponding dispatching interval 354.

The load demand of load d and renewable generation of renewable unit r in dispatching interval in and regulating interval s, $P_{dm}$ and $P_{rm}$, $P_{ds}$ and $P_{rs}$, can be determined according to:

$$P_{dm} = P_{dh} + \Delta P_{dh-m} \quad (9)$$

$$P_{ds} = P_{dm} + \Delta P_{dm-s} \quad (10)$$

$$P_{rm} = P_{rh} + \Delta P_{rh-m} \quad (11)$$

$$P_{rs} = P_{rm} + \Delta P_{rm-s} \quad (12)$$

$\Delta P_{dh-m}$ and $\Delta P_{dm-s}$ are the deviation between load demands of load d in dispatching interval in and scheduling interval h, and the deviation between load demands in regulating interval s and dispatching interval in, respectively.

$\Delta P_{ah-m}$ and $\Delta P_{am-s}$ are the deviation between renewable generations of renewable r in dispatching interval in and scheduling interval h, and the deviation between renewable generations in regulating interval s and dispatching interval in, respectively.

Unit Commitment

The aim of first level is to determine the commitment schedule of generating units that are available in the system to satisfy the system power balance, reserve capacities, frequency regulation speed, and network security requirements for a next day-ahead period, at the minimum cost. The first-level costs include the commitment (start-up, non-load, and shut-down), dispatch and regulation cost of the dispatchable units, and renewable curtailment and load shedding penalty. The committed generating units must have enough reserves to withstand unanticipated load and renewable variations, and sufficient regulation capability and response speed to maintain frequency quality.

The unit commitment is formulated as a master problem and a set of slave problems. The master problem is used to determine the on/off status of dispatchable units, and scheduling set points for each generation unit. The slave problem is used to verify whether the determined unit schedule to withstand certain uncertainty scenarios for each scheduling interval, and determine the sensitives of the generation adjustment cost over scheduling set points for current unit commitment schedule. The uncertainty scenarios of renewable generation and load within next day are generated using unscented transformation technique. The master and slave problems are iteratively solved to obtain a best unit commitment schedule with minimum commitment, dispatch and regulation cost.

The formulation of the master problem and corresponding dual variables for its constraints can be described as follows:

$$\text{Minimize Cost}^{UC} = \sum_{h=1}^{H} \sum_{g=1}^{G} C_{gh}^{SU} \max[0, u_{gh}^{ON} - u_{g(h-1)}^{ON}] + \quad (13)$$

$$\sum_{h=1}^{H} \sum_{g=1}^{G} C_{gh}^{SD} \max[0, u_{g(h-1)}^{ON} - u_{gh}^{ON}] +$$

$$\sum_{h=1}^{H} \sum_{g=1}^{G} (C_{gh}^{FIX} u_{gh}^{ON} + C_{gh}^{VAR} p_{gh}) +$$

$$\sum_{h=1}^{H} \sum_{g=1}^{G} \{C_{gh}^{RU} \max[0, p_{gh} - p_{g(h-1)}] +$$

$$C_{gh}^{RD} \max[0, p_{g(h-1)} - p_{gh}]\} + \sum_{h=1}^{H} \sum_{r=1}^{R} C_{rh}^{CURT} p_{rh}^{CURT} +$$

$$\sum_{h=1}^{H} \sum_{d=1}^{D} C_{dh}^{SHED} p_{dh}^{SHED} + \sum_{h=1}^{H} \sum_{k=1}^{K_h} W_{h,k} \text{Cost}_{h,k}^{UA} + \sum_{h=1}^{H} \text{Cost}_{h}^{GD}$$

Subject to:

$$(\alpha_h) \quad \sum_{g=1}^{G} p_{gh} + \sum_{r=1}^{R} (P_{rh} - p_{rh}^{CURT}) = \sum_{d=1}^{D} (P_{dh} - p_{dh}^{SHED}), \forall h \quad (14)$$

$(\beta_{gh}^{MAX})$ $\quad p_{gh} + p_{gh}^{RES+} \leq P_g^{MAX} u_{gh}^{ON}, \forall \{g, h\}$ (15)

$(\beta_{gh}^{MIN})$ $\quad -p_{gh} + p_{gh}^{RES-} \leq -P_g^{MIN} u_{gh}^{ON}, \forall \{g, h\}$ (16)

$(\gamma_{gh}^{UP})$ $\quad p_{gh} + p_{gh}^{RES+} - p_{g(h-1)} \leq (SU_g^{MAX} - RU_g^{MAX})$ (17)
$\max[0, u_{GH}^{ON} - u_{g(h-1)}^{ON}] + RU_g^{MAX} u_{gh}^{ON}, \forall \{g, h\}$ $(\gamma_{gh}^{DN})$ $\quad p_{g(h-1)} - p_{gh} + p_{gh}^{RES-} \leq (SD_g^{MAX} - RD_g^{MAX})$ (18)
$\max[0, u_{g(h-1)}^{ON} - u_{gh}^{ON}] + RD_g^{MAX} u_{g(h-1)}^{ON}, \forall \{g, h\}$ $(\lambda_h^{POS})$ $\quad -\sum_{g=1}^{G} p_{gh}^{RES+} \leq -RES_h^+, \forall h$ (19)

$(\lambda_h^{NEG})$ $\quad -\sum_{g=1}^{G} p_{gh}^{RES-} \leq -RES_h^-, \forall h$ (20)

$(\mu_h^{POS})$ $\quad -\sum_{g=1}^{G} \{(SU_g^{MAX} - RU_g^{MAX})\max[0, u_{gh}^{ON} - u_{g(h-1)}^{ON}] +$ (21)
$RU_g^{MAX} u_{gh}^{ON}\} \leq -SPEED_h^+, \forall h$ $(\mu_h^{NEG})$ $\quad -\sum_{g=1}^{G} \{(SD_g^{MAX} - RD_g^{MAX})\max[0, u_{g(h-1)}^{ON} - u_{gh}^{ON}] +$ (22)
$RD_g^{MAX} u_{g(h-1)}^{ON}\} \leq SPEED_h^-, \forall h$ $(\nu_{lh}^{POS})$ $\quad f_{lh}^{pos} = \sum_{g=1}^{G} \pi_{lg} p_{gh} + \sum_{r=1}^{R} \pi_{lr}(P_{rh} - p_{rh}^{CURT}) -$ (23)
$\sum_{d=1}^{D} \pi_{ld}(P_{dh} - P_{dh}^{SHED}) \leq F_{lh}^{MAX}, \forall l \in L^{OVR}$ $(\nu_{lh}^{NEG})$ $\quad f_{lh}^{neg} = -\sum_{g=1}^{G} \pi_{lg} p_{gh} - \sum_{r=1}^{R} \pi_{lr}(P_{rh} - p_{rh}^{CURT}) +$ (24)
$\sum_{d=1}^{D} \pi_{ld}(P_{dh} - P_{dh}^{SHED}) \leq F_{lh}^{MAX}, \forall l \in L^{OVR}$ $(\rho^{UA})$ $\quad \sum_{h=1}^{H}\sum_{k=1}^{K_h} W_{h,k}\left(Cost_{h,k}^{UA(0)} + \sum_{g=1}^{G}\frac{\partial Cost_{h,k}^{UA}}{\partial p_{gh}}\right.$ (25)
$\left.(p_{gh} - p_{gh}^{(0)})\right) \leq \sum_{h=1}^{H}\sum_{k=1}^{K_h} W_{h,k} Cost_{h,k}^{UA}$ $(\rho^{GD})$ $\quad \sum_{h=1}^{H}\left(Cost_h^{GD(0)} + \sum_{g=1}^{G}\frac{\partial Cost_h^{GD}}{\partial p_{gh}}(p_{gh} - p_{gh}^{(0)})\right) \leq$ (26)
$\sum_{h=1}^{H} Cost_h^{GD}$ $\sum_{h=1}^{UT_{g0}^{LEFT}} [1 - u_{gh}^{ON}] = 0, \forall g$ (27)

$UT_{gh}^{LEFT}[u_{gh}^{ON} - u_{g(h-1)}^{ON}] - \sum_{t=h}^{h+UT_{gh}^{LEFT}} u_{gt}^{ON} \leq 0,$ (28)
$\forall \{h > UT_{g0}^{LEFT}, g\}$ $\sum_{h=1}^{DT_{g0}^{LEFT}} u_{gh}^{ON} = 0, \forall g$ (29)

$DT_{gh}^{LEFT}[u_{g(h-1)}^{ON} - u_{gh}^{ON}] - \sum_{t=h}^{h+DT_{gh}^{LEFT}} (1 - u_{gt}^{ON}) \leq 0,$ (30)
$\forall \{h > DT_{g0}^{LEFT}, g\}$ $p_{rh}^{CURT} \leq P_{rh}, \forall \{r, h\}$ (31)

$p_{dh}^{SHED} \leq P_{dh}, \forall \{d, h\}$ (32)

where, g, r, d, l, and h are the indices for dispatchable generators, renewable generators, loads, transmission lines, and scheduling intervals, and G, R, D, L and H are the numbers of dispatchable generators, renewable generators, loads, transmission lines and scheduling intervals. $L^{OVR}$ is the set of overload transmission lines. The decision variables for the first-level master problem are $u_{gh}^{ON}$, $p_{gh}$, $p_{gh}^{RES+}$, $p_{gh}^{RES-}$, $p_{rh}^{CURT}$ and $p_{dh}^{SHED}$. $u_{gh}^{ON}$ is a binary variable indicating whether generator g is committed in scheduling interval h, $p_{gh}$, $p_{gj}^{RES+}$ and $p_{gh}^{RES-}$ are the generation output, ramp-up reserve and ramp-down reserve of generator g in scheduling interval h. $p_{rh}^{CURT}$ is the renewable curtailment for renewable r in scheduling interval h. $p_{dh}^{SHED}$ is the load shedding for load d in scheduling interval h. Mathematically the master problem is a mixed integer and linear programming problem.

Equation (13) is the objective function for the master problem. $Cost^{UC}$ is the total cost related to unit commitment schedule. $C_{gh}^{SU}$ and $C_{gh}^{SD}$ are the start-up and shut-down costs of generator g if started and stopped in scheduling interval h. $C_{gh}^{FIX}$, $C_{gh}^{VAR}$, $C_{gh}^{RU}$ and $C_{gh}^{RD}$ are the fixed no-load cost, per unit variable cost, and ramp-up and ramp-down cost for generator g in scheduling interval h. $C_{rh}^{CURT}$ is per unit curtailment cost for renewable r in scheduling interval h. $C_{dh}^{SHED}$ is per unit shedding cost for load d in scheduling interval h. $Cost_{h,k}^{UA}$ is the additional generation adjustment costs of uncertainty scenario k in scheduling interval h that will be expressed as an linear function of scheduling set points based on corresponding sensitivities of generation adjustment cost over scheduling set points determined by the slave problem corresponding to the uncertainty scenario. $Cost_h^{GD}$ is the additional cost related to generation dispatch and frequency regulation for the scheduling interval h, and it is also expressed a linear function of scheduling set points based on the corresponding sensitivities of generation dispatch and regulation cost over scheduling set points determined in the second level. As expressed in (13), the objective of the master problem is to minimize the total operational cost for a day-ahead operation cycle, including the cost related to unit commitments, unused renewable, load shedding, the additional generation adjustment costs caused by the renewable and load fluctuations under unanticipated events, and also the additional cost related to generation dispatch and frequency regulation that will be determined in the second and third levels of the co-optimization. The costs terms related to unit commitment include the startup cost, the shutdown cost, the fixed non-load cost, the variable cost for scheduling set points, the ramp up and down costs between consecutive scheduling intervals. The start-up and shut-down costs are above zero whenever the units change their commitment status. As regards load shedding, the model considers the possibility of voluntary load shedding resulting from contractual arrangements between generators and consumers.

Equation (14) is the relaxed power supply-demand balance constraint for each scheduling interval. $P_{rh}$ is the forecasted renewable output for renewable r in scheduling interval h. $P_{dh}$ is the forecasted load demand for load din scheduling interval h. $\alpha_h$ is the dual variables of constraints (14). According to this restriction, the sum of all the power produced by all the units present in the system, deducted the curtailed power of intermittent renewable sources is equal to the load in the system, minus the load shed.

Equations (15)-(18) represent the power output bounds. $RU_{gh}^{MAX}$ and $RD_{gh}^{MAX}$, $SU_{gh}^{MAX}$ and $SD_{gh}^{MAX}$, $P_{gh}^{MIN}$ and $P_{gh}^{MAX}$ are the ramp-up and ramp-down thresholds, the start-up and shut-down ramp thresholds, and the minimal and maximal outputs for each scheduling interval of generator g. $\beta_{gh}^{MAX}$, $\beta_{gh}^{MIN}$, $\gamma_{gh}^{UP}$, and $\gamma_{gh}^{DN}$ are the dual variables of constraints (15)-(18) respectively. The minimum power output, $P_{gh}^{MIN}$ is determined by the must-run or stable generation level of the unit if it is committed. On the other hand, the output is limited by the available capacity, $P_{gh}^{MAX}$ if the unit is committed. The power output in a given interval also depends on the output levels in the previous and the following intervals and on the ramping capabilities of the unit. If the unit was down, the MAX ramping-up capability is given by the maximum start up ramp, $SU_{gh}^{MAX}$ while if the unit was online the limit is defined by the maximum ramp up rate, $RU_{gh}^{MAX}$. Similarly, the ramp down capability is limited by the maximum ramp down, $RD_{gh}^{MAX}$ or the maximum shut down ramp rate, $SD_{gh}^{MAX}$.

Equations (19)-(20), and (21)-(22) represent the upwards and downwards reserve capacity and regulation speed requirements in the system. $RES_h^+$ and $RES_h^-$, $SPEED_h^+$ and $SPEED_h^-$, are the required minimum upward and downward reserve capacities and regulation speeds in scheduling interval h. $\lambda_h^{POS}$, $\lambda_h^{NEG}$, $\mu_h^{POS}$ and $\mu_h^{NEG}$ are the dual variables of constraints (19)-(22) respectively. The reserve capacities are required for handling the maximum fluctuations of renewable and loads, and the regulation speeds are required for guaranteeing that response of generation unit are fast enough to maintain good frequency quality.

Equations (23) and (24) are the network-related constraints. The flows on the transmission lines for both positive and negative directions are limited by the capacities of the lines. Those constraints are relaxed that only constraints corresponding to the overloaded lines identified by a power flow solution are used. $f_{lh}^{POS}$, $f_{lh}^{NEG}$ and $F_{lh}^{MAX}$ are the power flows at positive and negative directions on the transmission line l and its capacity in scheduling interval h. $\pi_{lg}$, $\pi_{lr}$ and $\pi_{ld}$ are the allocation factors of dispatchable generator g, renewable r and load d to the power flow on transmission line l in scheduling interval h, which can be determined using DC load flow formulations. $v_{lh}^{POS}$, and $v_{lh}^{NEG}$ are the dual variables of constraints (23)-(24) respectively.

Equation (25) is the generation adjustment cost constraint for uncertainty scenarios of each schedule hour. $Cost_{h,k}^{UA(0)}$ and $$\frac{\partial Cost_h^{GD}}{\partial p_{gh}}$$

are the initial additional generation adjustment costs, and corresponding sensitivities of generation adjustment cost over scheduling set point in scheduling interval h, $p_{gh}$. $p_{gh}^{(0)}$ is the initial scheduling set point of generator g in scheduling interval h. $\rho^{UA}$ is the dual variables of constraint (25).

Equation (26) is the generation dispatch and frequency regulation cost constraint based on detailed simulation of generation dispatch and frequency regulation at each dispatching interval and regulating interval during the operation cycle. $Cost_h^{GD(0)}$ and $$\frac{\partial Cost_h^{GD}}{\partial p_{gh}}$$

are the initial generation dispatch and frequency regulation costs, and corresponding sensitivities of generation dispatch and regulation cost over scheduling set point in scheduling interval h, $p_{gh} \cdot \rho^{GD}$ is the dual variables of constraint (26).

Equations (27)-(30) represent the minimum up and down times for generators. $UT_{g0}^{LEFT}$ and $DT_{g0}^{LEFT}$ are the numbers of scheduling intervals the unit must be online and offline at the beginning of operation cycle:

$$UT_{g0}^{LEFT} = \min\{H, (UT_g^{MIN} - UT_{g0})u_{g0}^{ON}\} \quad (33)$$

$$DT_{g0}^{LEFT} = \min\{H, (DT_g^{MIN} - DT_{g0})(1 - u_{g0}^{ON})\} \quad (34)$$

$UT_g^{MIN}$ and $DT_g^{MIN}$ are the minimal up and down time for generator g. $UT_{g0}$ and $DT_{g0}$ are the total numbers of up and down scheduling intervals before the beginning of first scheduling interval, $u_{g0}^{ON}$ is the initial commitment status. $UT_{gh}^{LEFT}$ and $DT_{gh}^{LEFT}$ are the unit remaining committed and de-committed time for the unit g if started and stopped in scheduling interval h:

$$UT_{gh}^{LEFT} = \min\{H-h, UT_g^{MIN}\} \quad (35)$$

$$DT_{gh}^{LEFT} = \min\{H-h, DT_g^{MIN}\}. \quad (36)$$

The operation of the generation units is limited by the amount of time the unit has been running or stopped. Due to the physical characteristics of the generators, once a unit is started-up it cannot be shut down immediately, while if the unit is shut down it may not be started up immediately. If the unit is initially started up, it has to remain committed until reaching the minimum up time. If the unit is started during the operation cycle, the time it has to remain online is the minimum up time, but cannot exceed the time remaining in the operation cycle. If the unit is initially shut down, it has to remain de-committed until reaching the minimum down time. If the unit is stopped during the operation cycle, the time it has to remain offline is the minimum down time, but cannot exceed the time remaining in the operation cycle.

Equation (31) is the renewable curtailment constraint. If curtailment of intermittent generation sources is allowed, the amount of curtailed power is bounded by the output of the renewable units present.

Equation (32) is the load shedding constraint. If load shedding is allowed, the amount of shed load is limited by the shedding capacity contracted on that load (e.g. through interruptible industrial contracts).

It is worthy to note that only the generation dispatch and frequency regulation for base scenario are considered in the above formulation for the first level for sake of computation efficiency. If needed, the corresponding ones for non-base uncertainty scenarios can also be considered. In such uncertainty scenarios, the relevant cost is weighted by the weight factor of the uncertainty scenario under study to be added into Equation (13), and there are also constraints to be added for representing the corresponding generation dispatch and regulation cost as a linear function of generation set points, $p_{gh,k}$ (not $p_{gh}$).

After the optimal solution has been found for the master problem, we can determine the day-ahead locational marginal prices (LMPs) for energy and reserve.

Locational Marginal Prices (LMPs) can be derived from the dual variables in the previously described mathematical formulation of unit commitment problem expressed in (13)-(32). Dual variables are obtained after the optimal integer solution is obtained, by solving a restricted linear program with constraints that hold the integer variables equal to their values in the optimal solution.

The marginal prices for the energy, and regulation capacity and speed derived based on the Lagrangian function for the constrained optimization problem in (13)-(32). Generation reserve is paid the reserve locational marginal price at the bus where it is located, and the generation reserves and regulation speeds can be in either upward or downward direction.

According to the definition of marginal price, the energy locational marginal price for generator g in scheduling interval h, $LMP_{P_{gh}}$ can be derived through calculating the partial derivatives of Lagrangian function over power output of generator g, $p_{gh}$:

$$LMP_{P_{gh}} = -\alpha_h - \beta_{gh}^{MAX} + \beta_{gh}^{MIN} - \gamma_{gh}^{UP} + \gamma_{gh}^{DN} - \sum_{l=1}^{L^{OVR}} (v_{lh}^{POS} - v_{lh}^{NEG})\pi_{lg} - \rho^{GD}\frac{\partial Cost_h^{GD}}{\partial p_{gh}} - \rho^{UA}\sum_{k=1}^{K_h} W_{h,k}\left(\frac{\partial Cost_{h,k}^{UA}}{\partial p_{gh}}\right) \quad (37)$$

The upward and downward reserve prices, $LMP_{P_{gh}}^{RES+}$ and $LMP_{P_{gh}}^{RES-}$ can be defined as the marginal cost of Lagrangian function over upward and downward reserves of generator g:

$$LMP_{P_{gh}}^{RES+} = -\beta_{gh}^{MAX} - \gamma_{gh}^{UP} + \lambda_h^{POS} \quad (38)$$

$$LMP_{P_{gh}}^{RES-} = -\beta_{gh}^{MIN} - \gamma_{gh}^{DN} + \lambda_h^{NEG} \quad (39)$$

The upward and downward regulation speed prices, $LMP_{RU_{gh}^{MAX}}$ and $LMP_{RD_{gh}^{MAX}}$ can be defined as the marginal cost of Lagrangian function over upward and downward ramp rates of generator g;

$$LMP_{RU_{gh}^{MAX}} = -\gamma_{gh}^{UP} + \mu_h^{POS} \quad (40)$$

$$LMP_{RD_{gh}^{MAX}} = -\gamma_{gh}^{DN} + \mu_h^{NEG} \quad (41)$$

For a given uncertainty scenario in a given scheduling interval, the formulation of first level slave problem and corresponding dual variables for its constraints is given as follows:

$$\text{Minimize } Cost_{h,k}^{UA} = \quad (42)$$

$$\sum_{g=1}^{G} \{C_{gh}^{RU}\max[0, p_{gh,k} - p_{g(h-1)}] + C_{gh}^{RD}\max[0, p_{g(h-1)} - p_{gh,k}]\} +$$

$$\sum_{g=1}^{G} \{C_{gh}^{RU}\max[0, p_{gh,k} - p_{gh}] + C_{gh}^{RD}\max[0, p_{gh} - p_{gh,k}]\} +$$

$$\sum_{r=1}^{R} C_{rh}^{CURT}(p_{rh,k}^{CURT} - p_{rh}^{CURT}) + \sum_{d=1}^{D} C_{dh}^{SHED}(p_{dh,k}^{SHED} - p_{dh}^{SHED})$$

Subject to:

$$(\alpha_{h,k}) \quad \sum_{g=1}^{G} p_{gh,k} + \sum_{r=1}^{R}(P_{rh,k} - p_{rh,k}^{CURT}) = \sum_{d=1}^{D}(P_{dh,k} - p_{dh,k}^{SHED}), \quad (43)$$

$$(\beta_{gh,k}^{MAX}) \quad p_{gh,k} \leq P_{gh,k}^{MAX}, \forall g \quad (44)$$

$$(\beta_{gh,k}^{MIN}) \quad -p_{gh,k} \leq -P_{gh,k}^{MIN}, \forall g \quad (45)$$

$$(\gamma_{gh,k}^{UP}) \quad p_{gh,k} - p_{g(h-1)} \leq RU_{gh,k}^{MAX}, \forall g \quad (46)$$

$$(\gamma_{gh,k}^{DN}) \quad p_{g(h-1)} - p_{gh,k} \leq RD_{gh,k}^{MAX}, \forall g \quad (47)$$

$$(v_{lh,k}^{POS}) \quad f_{lh,k}^{POS} = \sum_{g=1}^{G}\pi_{lg}p_{gh,k} + \sum_{r=1}^{R}\pi_{lr}(P_{rh,k} - p_{rh,k}^{CURT}) - \sum_{d=1}^{D}\pi_{ld}(P_{dh,k} - P_{dh,k}^{SHED}) \leq F_{lh,k}^{MAX}, \forall l \in L^{OVR} \quad (48)$$

$$(v_{lh,k}^{NEG}) \quad f_{lh,k}^{NEG} = -\sum_{g=1}^{G}\pi_{lg}p_{gh,k} - \sum_{r=1}^{R}\pi_{lr}(P_{rh,k} - p_{rh,k}^{CURT}) + \sum_{d=1}^{D}\pi_{ld}(P_{dh,k} - P_{dh,k}^{SHED}) \leq F_{lh,k}^{MAX}, \forall l \in L^{OVR} \quad (49)$$

$$p_{rh,k}^{CURT} \leq P_{rh,k}, \forall r \quad (50)$$

$$p_{dh,k}^{SHED} \leq P_{dh,k} \forall d \quad (51)$$

where, k is the index for uncertainty scenarios. The decision variables for the slave problem are $p_{gh,k}$, $p_{rh,k}^{CURT}$ and $p_{dh,k}^{SHED}$. $p_{gh,k}$ is the output of generator g under uncertainty scenario k in scheduling interval h. $p_{rh,k}^{CURT}$ is the curtailment of renewable r under uncertainty scenario k in scheduling interval h. $p_{dh,k}^{SHED}$ is the load shedding of load d under uncertainty scenario k in scheduling interval h. The slave problem is a linear programming problem.

Equation (42) is the objective function of generation adjustment expressed as the minimization of the additional operational cost for scheduling interval h and uncertainty scenario k. This cost includes four items, including the additional ramping costs for the deviations between scheduling set points for the base scenario and generation outputs for the study sample uncertainty scenario for the study scheduling interval, the additional ramping costs for deviations between the scheduling set point for the base scenario in previous scheduling hour and generation output under sample uncertainty scenario for the study scheduling interval, the additional renewable curtailment cost determined based on the deviations between corresponding values for the base scenario and the values for the uncertainty scenario, and the additional load shedding cost determined based on the deviations between corresponding values for the base scenario and the values for the sample uncertainty scenario.

Equation (43) represents the relaxed power balance requirement with emergency actions including load shedding and renewable spillage. $P_{rh,k}$ is the output of renewable r under uncertainty scenario k in scheduling interval h. $P_{dh,k}$ is the load demand of load d under uncertainty scenario k in scheduling interval h. $\alpha_{h,k}$ is the dual variable of constraint (43).

Equations (44) and (45) represents the capacity limits of generators. $P_{gh,k}^{MAX}$ and $P_{gh,k}^{MIN}$ are the maximum and minimal output limits for generator g uncertainty scenario k in scheduling interval h, $$P_{gh,k}^{MAX} = P_g^{MAX} u_{gh}^{ON}, \quad (52)$$

$$P_{gh,k}^{MIN} = P_g^{MIN} u_{gh}^{ON}. \quad (53)$$

$\beta_{gh,k}^{MAX}$, and $\beta_{gh,k}^{MIN}$ are the dual variables of constraints (44)-(45) respectively.

Equations (46) and (47) represent the ramping capacity limits of generators. $RU_{gh,k}^{MAX}$ and $RD_{gh,k}^{MAX}$ are the ramp-up and ramp-down limits for uncertainty scenario k in scheduling interval h, $$RU_{gh,k}^{MAX} = (SU_g^{MAX} - RU_g^{MAX}) \max[0, u_{gh}^{ON} - u_{g(h-1)}^{ON}] + RU_g^{MAX} u_{gh}^{ON}, \quad (54)$$

$$RD_{gh,k}^{MAX} = (SD_g^{MAX} - RD_g^{MAX}) \max[0, u_{g(h-1)}^{ON} - u_{gh}^{ON}] + RD_g^{MAX} u_{g(h-1)}^{ON}. \quad (55)$$

$\gamma_{gh,k}^{UP}$, and $\gamma_{gh,k}^{DN}$, are the dual variables of constraints (46)-(47) respectively.

Equations (48) and (49) are the related network power flow limits for transmission lines at positive and negative directions, and only constraints for overloaded lines are considered. $f_{lh,k}^{POS}$, $f_{lh,k}^{NEG}$ and $F_{lh,k}^{MAX}$ are the power flows at positive and negative directions on the transmission line l and its capacity under uncertainty scenario k in scheduling interval h. $v_{lh}^{POS}$ and $v_{lh}^{NEG}$ are the dual variables of constraints (48)-(49) respectively.

Equation (50) represents that the amount of curtailed power is bounded by the output of the renewable units present.

Equation (51) represents the amount of shed load is limited by the total demands on that load.

Based on the relationship between the scheduling set points and generation outputs for uncertainty scenarios:

$$P_{gh} = P_{gh,k} - \max[0, P_{gh,k} - P_{gh}] + \max[p_{gh} - P_{gh,k}] \quad (56)$$

The sensitives of generation adjustment cost over scheduling set points can be determined as:

$$\frac{\partial \text{Cost}_{h,k}^{UA}}{\partial p_{gh}} = \quad (57)$$

$$-\alpha_{h,k} - \beta_{gh,k}^{MAX} + \beta_{gh,k}^{MIN} - \gamma_{gh,k}^{UP} + \gamma_{gh,k}^{DN} - \sum_{l=1}^{L^{OVR}} (v_{lh,k}^{POS} - v_{lh,k}^{NEG}) \pi_{lg}$$

Generation Dispatch

In the second level, the determined unit commitment scheme is checked against base operation scenarios to verify whether the unit commitment scheme satisfying the load and renewable fluctuations that occur at a short timescale, i.e. dispatching interval, typically 5 minutes.

The generation dispatch plan for each dispatchable generators during each dispatching interval (such as 5 minutes) are determined based on the determined unit commitment statues. The renewable generation and load profiles for dispatching intervals within next day can be generated from historical load profiles, or simply using linear extrapolation with ones at two consecutive hours.

For each dispatching interval IV within scheduling interval h, the formulation of generation dispatch and corresponding dual variables for its constraints can be described as:

$$\text{Minimize Cost}_h^{GD} = \quad (58)$$

$$\sum_{m=1}^{M_h} \sum_{g=1}^{G} \{C_{gm}^{RU} \max[0, p_{gm} - p_{gh}] + C_{gm}^{RD} \max[0, p_{gh} - p_{gm}]\} +$$

$$\sum_{m=1}^{M_h} \sum_{g=1}^{G} \{C_{gm}^{RU} \max[0, p_{gm} - p_{g(m-1)}] +$$

$$C_{gm}^{RD} \max[0, p_{g(m-1)} - p_{gm}]\} +$$

$$\sum_{m=1}^{M_h} \sum_{r=1}^{R} C_{rm}^{CURT} (p_{rm}^{CURT} - p_{rh}^{CURT}) +$$

$$\sum_{m=1}^{M_h} \sum_{d=1}^{D} C_{dm}^{SHED} (p_{dm}^{SHED} - p_{dh}^{SHED}) + \sum_{m=1}^{M_h} \text{Cost}_{h,m}^{FR}$$

Subject to:

$$(\alpha_m) \quad \sum_{g=1}^{G} p_{gm} + \sum_{r=1}^{R} (P_{rm} - p_{rm}^{CURT}) = \sum_{d=1}^{D} (P_{dm} - p_{dm}^{SHED}), \quad (59)$$
$$\forall m$$

$$(\beta_{gm}^{MAX}) \quad p_{gm} \leq P_{gm}^{MAX}, \forall \{g, m\} \quad (60)$$

$$(\beta_{gm}^{MIN}) \quad -p_{gm} \leq -P_{gm}^{MIN}, \forall \{g, m\} \quad (61)$$

$$(\gamma_{gm}^{UP}) \quad p_{gm} - p_{g(m-1)} \leq RU_{gm}^{MAX}, \forall \{g, m\} \quad (62)$$

$$(\gamma_{gm}^{DN}) \quad p_{g(m-1)} - p_{gm} \leq RD_{gm}^{MAX}, \forall \{g, m\} \quad (63)$$

$$(v_{lm}^{POS}) \quad f_{lm}^{POS} = \sum_{g=1}^{G} \pi_{lg} p_{gm} + \sum_{r=1}^{R} \pi_{lr} (P_{rm} - p_{rm}^{CURT}) - \quad (64)$$

$$\sum_{d=1}^{D} \pi_{ld} (P_{dm} - P_{dm}^{SHED}) \leq F_{lm}^{MAX}, \forall l \in L^{OVR}$$

$$(v_{lm}^{NEG}) \quad f_{lm}^{NEG} = -\sum_{g=1}^{G} \pi_{lg} p_{gm} - \sum_{r=1}^{R} \pi_{lr} (P_{rm} - p_{rm}^{CURT}) + \quad (65)$$

$$\sum_{d=1}^{D} \pi_{ld} (P_{dm} - P_{dm}^{SHED}) \leq F_{lm}^{MAX}, \forall l \in L^{OVR}$$

$$(\rho^{FR}) \quad \sum_{m=1}^{M_h} \left( \text{Cost}_{h,m}^{FR(0)} + \sum_{g=1}^{G} \frac{\partial \text{Cost}_{h,m}^{FR}}{\partial p_{gm}} (p_{gm} - p_{gm}^{(0)}) \right) \leq \quad (66)$$

$$\sum_{m=1}^{M_h} \text{Cost}_{h,m}^{FR}$$

$$p_{rm}^{CURT} \leq P_{rm}, \forall \{r, m\} \quad (67)$$

$$p_{dm}^{SHED} \leq P_{dm}, \forall \{r, m\} \quad (68)$$

where, m is the index for dispatching intervals, $M_h$ is the number of unit dispatching intervals in the scheduling interval h. The decision variables in the second level are $p_{gm}$, $p_{rm}^{CURT}$ and $p_{dm}^{SHED}$. $p_{gm}$ is the dispatching set point (i.e. dispatch production level) of generator g in dispatching interval m. $p_{rm}^{CURT}$ is the curtailment of renewable r in dispatching interval m. $p_{dm}^{SHED}$ is the load shedding of load din dispatching interval m.

Equation (58) is the objective function of generation dispatch expressed as the minimization of the operational cost for scheduling interval h, including the cost related to generation dispatch, additional unused renewable and load shedding compared with corresponding ones in the scheduling interval, and the additional cost related to frequency regulations. The cost related to generation dispatch includes the ramping costs defined by the deviations between scheduling set points and dispatching set points, and the ramping costs defined by the deviations between dispatching set points at two consecutive dispatching intervals. $\text{Cost}_h^{GD}$ is the total dispatch and regulation cost for all dispatching intervals in scheduling interval h. $C_{gm}^{RU}$ and $C_{gm}^{RD}$ are the per unit ramp-up and ramp-down costs of generator g in dispatching interval m. $C_{rm}^{CURT}$ is the per unit curtailment cost of renewable r in dispatching interval m. $C_{dm}^{SHED}$ is the per unit load shedding cost of load d in dispatching interval m. $\text{Cost}_h^{GD}$ is the total dispatch and regulation cost for all dispatching intervals in scheduling interval h. $\text{Cost}_{h,m}^{FR}$, is the additional frequency regulation costs that will be represented a linear function of dispatching set points based on the corresponding sensitivities of frequency regulation cost over dispatching set point $p_{gm}$ in dispatching interval in determined in the third level.

Equation (59) represents the relaxed power balance requirement with emergency actions including load shedding and renewable spillage. $P_{rm}$ is the forecasted output of renewable r in dispatching interval m. $P_{dm}$ is the forecasted demand of load d in dispatching interval m. $\alpha_m$ is the dual variable of constraint (59).

Equations (60) and (61) represents the capacity limits of generators. $P_{gm}^{MAX}$ and $P_{gm}^{MIN}$ are the maximum and minimal output limits for generator g in dispatching interval m. $\beta_{gm}^{MAX}$, and $\beta_{gm}^{MIN}$ are the dual variables of constraints (60)-(61) respectively.

Equations (62) and (63) represent the ramping capacity limits of generators. $RU_{gm}^{MAX}$ and $RD_{gm}^{MAX}$ are the ramp-up and ramp-down limits of generator g in dispatching interval in, and determined according to:

$$RU_{gm}^{MAX} = \tau_{h-m}(SU_g^{MAX} - RU_g^{MAX}) \max[0, u_{gh}^{ON} - u_{g(h-1)}^{ON}] + \tau_{h-m} RU_g^{MAX} u_{gh}^{ON} \quad (69)$$

$$RD_{gm}^{MAX} = \tau_{h-m}(SD_g^{MAX} - RD_g^{MAX}) \max[0, u_{g(h-1)}^{ON} - u_{gh}^{ON}] + \tau_{h-m} RD_g^{MAX} u_{g(h-1)}^{ON} \quad (70)$$

$\tau_{h-m}$ is the ratio of length of dispatching interval over length of scheduling interval. $\gamma_{gm}^{UP}$, and $\gamma_{gm}^{DN}$ are the dual variables of constraints (62)-(63) respectively.

Equations (64) and (65) are the relaxed network power flow limits for transmission lines at positive and negative directions, and only overloaded lines are considered. $f_{lm}^{POS}$, $f_{lm}^{NEG}$ and $F_{lm}^{MAX}$ are the power flows at positive and negative directions on the transmission line l and its capacity in dispatching interval m. $v_{lm}^{POS}$, and $v_{lm}^{NEG}$ are the dual variables of constraints (64)-(65) respectively.

Equation (66) is the generation regulation cost constraint. $\text{Cost}_{h,m}^{FR(0)}$ and $$\frac{\partial \text{Cost}_{h,m}^{FR}}{\partial p_{gm}}$$

are the initial generation regulation costs, and corresponding sensitivities of generation regulation cost over dispatching set point $p_{gm}$ in dispatching interval in. $p_{gm}^{(0)}$ is the initial dispatching set point of generator g in dispatching interval m. $\rho^{FR}$ is the dual variable of constraint (66).

Equation (67) represents that the amount of curtailed power is bounded by the output of the renewable units present.

Equation (68) represents the amount of shed load is limited by the total demands on that load.

The dispatching set point is related to scheduling set point according to:

$$p_{gh} = p_{gm} - \max[0, p_{gm} - p_{gh}] + \max[0, p_{gh} - p_{gm}] \quad (71)$$

The sensitivities of generation dispatch and regulation cost over scheduling set points can be obtained as:

$$\frac{\partial \text{Cost}_m^{GD}}{\partial p_{gh}} = -\alpha_m - \beta_{gm}^{MAX} + \beta_{gm}^{MIN} - \gamma_{gm}^{UP} + \quad (72)$$

$$\gamma_{gm}^{DN} - \sum_{l=1}^{L^{OVR}} (v_{lm}^{POS} - v_{lm}^{NEG})\pi_{lg} - \sum_{m=1}^{M_h} \frac{\partial \text{Cost}_{h,m}^{FR}}{\partial p_{gm}}$$

Frequency Regulation

In the third level, the frequency regulation is used to simulate the power system to deal with fluctuations in load and generation that occur at a much faster timescale, i.e. regulating interval, typically 4 seconds. The historical profile of load and generation for this timescale can be used to determine the expected frequency regulation and performance cost for each generation unit. The frequency regulating set points are determined based on load and renewable variations and frequency requirements for each regulating interval. The performance for generation units to follow the regulating set points is measured by the sum of deviation of setting points and actual achieved mechanical outputs of generation units. The third level includes two steps, the first step is a secondary frequency control step that determines the regulation controlling signals for each regulating interval, and the second step is a primary frequency control step that enables the generation outputs following the regulation controlling signals through a primary controller of the generation unit.

The formulation of determining regulating set points for frequency regulation and corresponding dual variables for its constraints can be described as:

$$\text{minimize Cost}_{h,m}^{FR} = \quad (73)$$

$$\sum_{s=1}^{S_{h,m}} \sum_{g=1}^{G} \{C_{gs}^{RU} \max[0, p_{gs}^C - p_{gm}] + C_{gs}^{RD} \max[0, p_{gm} - p_{gs}^C]\} +$$

$$\sum_{s=1}^{S_{h,m}} \sum_{g=1}^{G} \{C_{gs}^{RU} \max[0, p_{gs}^C - p_{g(s-1)}^C] +$$

$$C_{gs}^{RD} \max[0, p_{g(s-1)}^C - p_{gs}^C]\} +$$

$$\sum_{s=1}^{S_{h,m}} \{C_s^{FU} \max[0, \omega_s - \omega_s^0] + C_s^{FD} \max[0, \omega_s^0 - \omega_s]\} +$$

$$\sum_{s=1}^{S_{h,m}} \text{Cost}_{h,m,s}^{RP}$$

Subject to:

$$(\alpha_s) \quad \left(\text{DAMP}_s + \sum_{g=1}^{G} \frac{1}{\text{DROOP}_g}\right)(\omega_s - \omega_s^0) - \sum_{g=1}^{G} (p_{gs} - p_{gm}) = \sum_{r=1}^{R} (P_{rs} - p_{rm}) - \sum_{d=1}^{D} (P_{ds} - p_{dm}), \forall s \quad (74)$$

$$(\beta_{gs}^{MAX}) \quad p_{gs} \leq P_{gs}^{MAX}, \forall \{g, s\} \quad (75)$$

$$(\beta_{gs}^{MIN}) \quad -p_{gs} \leq -P_{gs}^{MIN}, \forall \{g, s\} \quad (76)$$

$$(\gamma_{gs}^{UP}) \quad p_{gs}^C - p_{g(s-1)}^C \leq RU_{gs}^{MAX}, \forall \{g, s\} \quad (77)$$

$$(\gamma_{gs}^{DN}) \quad p_{g(s-1)}^C - p_{gs}^C \leq RD_{gs}^{MAX}, \forall \{g, s\} \quad (78)$$

$$(\lambda_{gs}) \quad p_{gs} - p_{gs}^C + \frac{\omega_s - \omega_s^0}{\text{DROOP}_g} = 0, \forall \{g, s\} \quad (79)$$

$$(\mu_s^{POS}) \quad \omega_s - \omega_s^0 \leq \Delta\omega^{MAX}, \forall s \quad (80)$$

$$(\mu_s^{NEG}) \quad -\omega_s + \omega_s^0 \leq \Delta\omega^{MAX}, \forall s \quad (81)$$

$$(v_{ls}^{POS}) \quad f_{ls}^{POS} = \sum_{g=1}^{G} \pi_{lg} p_{gs} + \sum_{r=1}^{R} \pi_{lr}(P_{rs} - p_{rm}^{CUT}) - \sum_{d=1}^{D} \pi_{ld}(P_{ds} - p_{dm}^{SHED}) \leq F_{ls}^{MAX}, \forall l \in L^{OVR} \quad (82)$$

$$(v_{ls}^{NEG}) \quad f_{ls}^{NEG} = -\sum_{g=1}^{G} \pi_{lg} p_{gs} - \sum_{r=1}^{R} \pi_{lr}(P_{rs} - p_{rm}^{CUT}) + \sum_{d=1}^{D} \pi_{ld}(P_{ds} - p_{dm}^{SHED}) \leq F_{ls}^{MAX}, \forall l \in L^{OVR} \quad (83)$$

$$(\rho^{RP}) \quad \sum_{s=1}^{S_{h,m}} \text{Cost}_{h,m,s}^{RP(0)} + \sum_{s=1}^{S_{h,m}} \sum_{g=1}^{G} \frac{\partial \text{Cost}_{h,m,s}^{RP}}{\partial p_{gs}^C}(p_{gs}^C - p_{gs}^{C(0)}) \leq \sum_{s=1}^{S_{h,m}} \text{Cost}_{h,m,s}^{RP} \quad (84)$$

where, s is the index for regulating intervals, $S_{h,m}$ is the number of unit regulating intervals in the dispatching interval in and scheduling interval h. The decision variables in the third level are $p_{gs}^C$, and $\omega_s$. $p_{gs}^C$ is the regulating set point, i.e. generation control command of generator g in regulating interval s. $\omega_s$ is the system angular frequency in regulating interval s.

Equation (73) is the objective function of frequency regulation expressed as the minimization of the operational cost for regulating interval s, including the additional cost related to secondary frequency regulation, and the additional cost related to the performance of following regulation signals of primary frequency controller. The cost related to secondary frequency regulation includes the ramping costs defined by the deviations between the dispatching set points and regulating set points, the ramping costs defined the deviations of regulating set points between two consecutive regulating intervals, and the ramping costs defined by the deviations of system angular frequency in the regulating interval and normal system angular frequency. $\text{Cost}_{h,m}^{FR}$ is the total frequency regulation cost for the dispatching interval m in interval h. $C_{gs}^{RPU}$ and $C_{gs}^{RPD}$ are the per unit upward and downward ramping costs for regulating set point deviations, and $C_{gs}^{FU}$ and $C_{gs}^{FD}$ are the per unit upward and downward ramping costs for system frequency deviations. $\omega_s^0$ is rated/normal system angular frequency. $\text{Cost}_{h,m,s}^{RP}$ is the cost for generation regulation performance in regulating interval s, defined as:

$$\text{Cost}_{h,m,s}^{RP} = \sum_{g=1}^{G} (C_{gs}^{RPU} \max(0, p_{gs}^C - p_{gs}^M) + C_{gs}^{RPD} \max(0, p_{gs}^M - p_{gs}^C)) \quad (85)$$

$p_{gs}^M$ is the mechanical output of generator g in regulating interval s,

Equation (74) represents the relaxed power balance requirement with frequency changes. $\text{DAMP}_s$ is the system damping factor in regulating interval s. $\text{DROOP}_g$ is the droop parameter of generation g. $p_{gs}$ is the generation output of generator g in regulating interval s. $P_{rs}$ is the generation output of renewable r in regulating interval s. $P_{ds}$ is the forecasted demand of load d in regulating interval s. $\alpha_s$ is the dual variable of constraint (74).

Equations (75) and (76) represent the capacity limits of generators. $P_{gs}^{MAX}$ and $P_{gs}^{MIN}$ are the maximum and minimal output limits for generator g in regulating interval s. $\beta_{gs}^{MAX}$, and $\beta_{gs}^{MIN}$ are the dual variables of constraints (75)-(76) respectively.

Equations (77) and (78) represent the ramping capacity limits of generators. $RU_{gs}^{MAX}$ and $RD_{gs}^{MAX}$ are the ramp-up and ramp-down limits of generator g in regulating interval s, and determined according to:

$$RU_{gs}^{MAX} = \tau_{h-s}(SU_g^{MAX} - RU_g^{MAX}) \max[0, u_{gh}^{ON} - u_{g(h-1)}^{ON}] + \tau_{h-s} RU_g^{MAX} u_{gh}^{ON}$$

$$RD_{gs}^{MAX} = \tau_{h-s}(SD_g^{MAX} - RD_g^{MAX}) \max[0, u_{g(h-1)}^{ON} - u_{gh}^{ON}] + \tau_{h-s} RD_g^{MAX} u_{g(h-1)}^{ON}$$

$\tau_{h-s}$ is the ratio of length of regulating interval over length of scheduling interval. $\gamma_{gs}^{UP}$, and $\gamma_{gs}^{DN}$ are the dual variables of constraints (77)-(78) respectively.

Equation (79) represents the relationship between generation regulating set points, generation output and system angular frequency for each regulation interval. $\lambda_{gs}$ is the dual variable of constraint (79).

Equations (80) and (81) represent the maximum allowed frequency deviations. $\Delta\omega^{MAX}$ is maximum allowed frequency deviation. $\mu_s^{POS}$, and $\mu_s^{NEG}$ are the dual variables of constraints (80)-(81) respectively.

Equations (82) and (83) are the relaxed network power flow limits for transmission lines at positive and negative directions. Only the overloaded lines are taken into account. $f_{ls}^{POS}$, $f_{ls}^{NEG}$ and $F_{ls}^{MAX}$ are the power flows at positive and negative directions on the transmission line l and its capacity in regulating interval s. $v_{is}^{POS}$, and $v_{is}^{NEG}$ are the dual variables of constraints (82)-(83) respectively.

Equation (84) is the generation regulation performance cost constraint for all regulating intervals in the dispatching interval in of scheduling interval h.

$$\frac{\partial \text{Cost}_{h,m,s}^{PR}}{\partial p_{gs}^C}$$

is the sensitivities of frequency regulation performance cost over regulating set point $p_{gs}^C$ in regulating interval s. $\text{Cost}_{h,m,s}^{PR(0)}$ and $p_{gs}^{C(0)}$ are the initial generation regulation performance cost and initial regulating set point in regulating interval s. $\rho^{RP}$ is the dual variable of constraint (84).

The sensitivities of frequency regulation cost over dispatching set points can be determined as:

$$\frac{\partial Cost_{h,mn}^{FR}}{\partial p_{gm}} = -\alpha_s \qquad (86)$$

Figure 4:
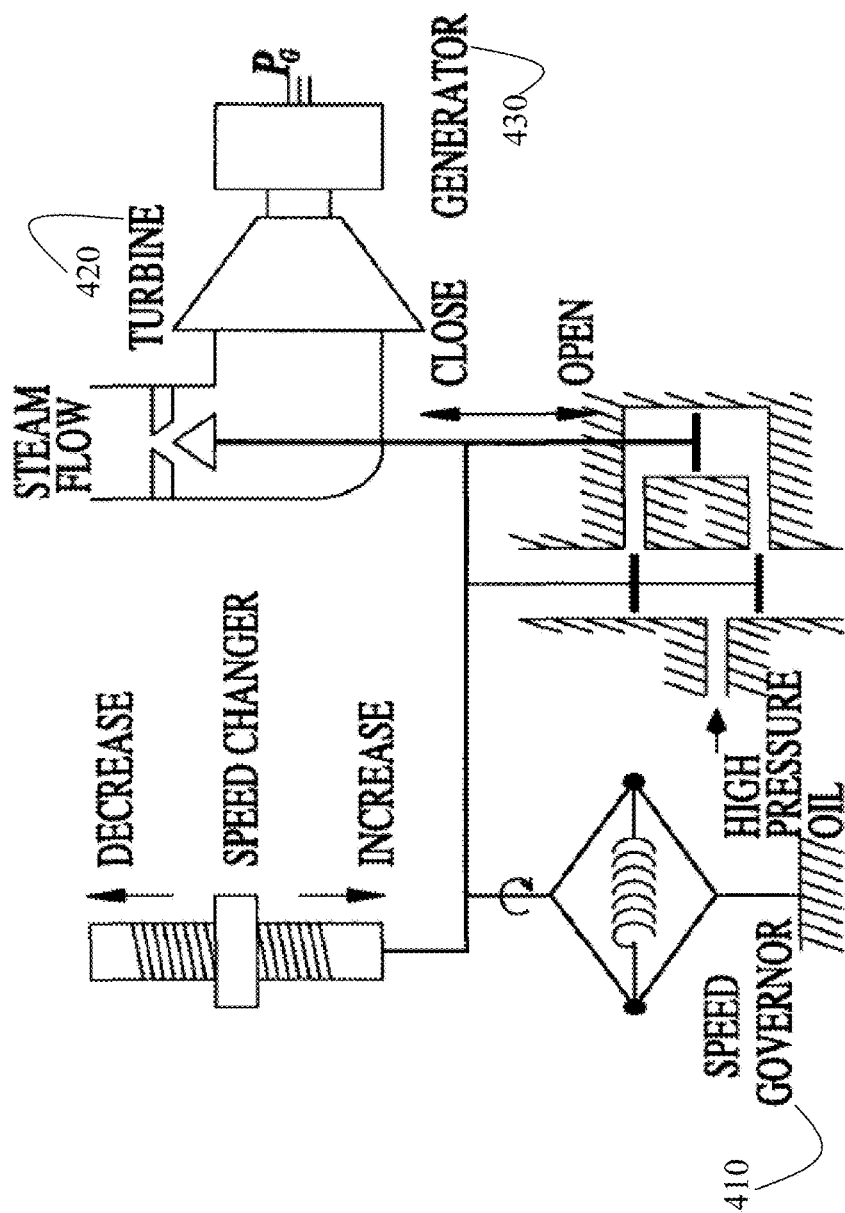
FIG. 4 is a schematic of a primary control unit for a generation unit, according to some embodiments of the present disclosure.

The ability of a generator 430 in following the generation control signal depends on its technology and physical characteristics. Without loss of generality, we consider a governor-turbine control model for each generator as shown in FIG. 4, where a speed governor 410 senses the changes in its control command set points, i.e., the generation regulating set points, $p_g^C(t)$ and converts them into valve actions. A turbine 420 then converts the changes in valve positions into changes in mechanical power output, i.e., generation signal $p_g^M(t)$ of the generator 430.

The governor-turbine control is often modeled as a two-state dynamic system: one state corresponds to the speed governor and one state corresponds to the turbine valve position. The relationship between $p_{gs}^C(t)$ and $p_{gs}^M(t)$ can be described as:

$$\left(1 + T_g \frac{d}{dt}\right)\left(1 + T_t \frac{d}{dt}\right) p_g^M(t) = p_g^C(t) \qquad (87)$$

where, $T_g$ and $T_t$ are the time constants for its governor and turbine.

It is worthy to note that the present disclosure only takes a simple two-state model as an example to demonstrate how to include the primary control performance into the unit commitment solution. Same principles can be easily to extend to more complicated or practical controller models.

For a given time t, and its corresponding regulating interval s, the time-domain continuous signal $p_g^C(t)$ can be represented in form of a weighted summation of several unit step functions:

$$p_g^C(t) = \sum_{i=1}^{s} [(p_{gi}^C - p_{g(i-1)}^C)u(t - 4(i-1))] \qquad (88)$$

The weights are the increase of generation control set points $p_g^C$ at each interval s. The unit step function is defined as:

$$u(t) = \begin{cases} 0 & t < 0 \\ 1 & t \geq 0 \end{cases}. \qquad (89)$$

By applying Laplace transform and inverse Laplace transform to (74) and (75), the mechanical output of generator g in time t can be determined according to:

$$p_g^M(t) = \qquad (90)$$

$$\left(\frac{T_g T_t \left(e^{-\frac{t}{T_g}} - e^{-\frac{t}{T_t}}\right)}{T_g - T_t}\right)\frac{dp_g^M}{dt}(0^-) + \left(\frac{T_g e^{-\frac{t}{T_g}} - T_t e^{-\frac{t}{T_t}}}{T_g - T_t}\right) p_g^M(0^-) +$$

-continued $$\sum_{i=1}^{s}(p_{gi}^C - p_{g(i-1)}^C)\left(1 - \frac{T_g e^{-\frac{t-4(i-1)}{T_g}} - T_t e^{-\frac{t-4(i-1)}{T_t}}}{T_g - T_t}\right) u[t - 4(i-1)]$$

Where $p_g^M(0^-)$ and $$\frac{dp_g^M}{dt}(0^-)$$

are initial conditions for generation mechanical output, and its derivative. For example, $p_g^M(0^-) = p_{g0}^C$, and $$\frac{dp_g^M}{dt}(0^-) = 0.$$

The mechanical output of generator g at regulating interval s is determined according to $$p_{gs}^M = p_g^M \qquad (91)$$

According to (85) and (90), we can get the sensitives of frequency regulation performance cost over regulation setting points as:

$$\frac{\partial Cost_{h,m,s}^{MC}}{\partial p_{gs}^C} = \left(1 - \frac{T_g e^{-\frac{4}{T_g}} - T_t e^{-\frac{4}{T_t}}}{T_g - T_t}\right) \qquad (92)$$

$$\left(C_{gs}^{MCU} \max\left(0, \frac{p_{gs}^M - p_{gs}^C}{|p_{gs}^M - p_{gs}^C|}\right) - C_{gs}^{MCD} \max\left(0, \frac{p_{gs}^C - p_{gs}^M}{|p_{gs}^C - p_{gs}^M|}\right)\right)$$

Figure 5:
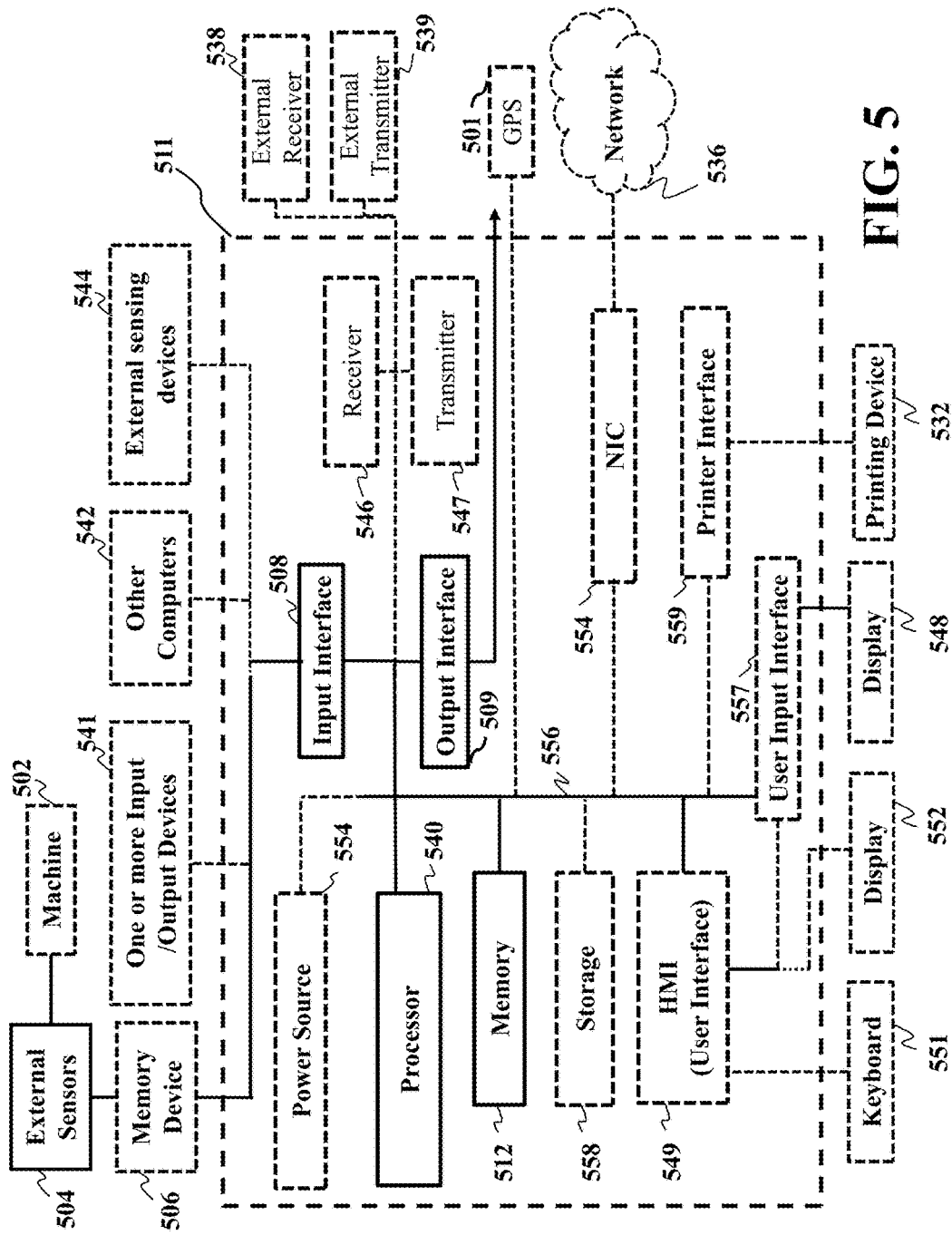
FIG. 5 is a block diagram of illustrating the method of FIG. 1A, that can be implemented using an alternate computer or processor, according to embodiments of the present disclosure.

FIG. 5 is a block diagram of illustrating the method of FIG. 1A, that can be implemented using an alternate computer or processor, according to embodiments of the present disclosure. The computer 511 includes a processor 540, computer readable memory 512, storage 558 and user interface 549 with display 552 and keyboard 551, which are connected through bus 556. For example, the user interface 549 in communication with the processor 540 and the computer readable memory 512, acquires and stores the data in the computer readable memory 512 upon receiving an input from a surface, keyboard surface, of the user interface 557 by a user.

Contemplated is that the memory 512 can store instructions that are executable by the processor, historical data, and any data to that can be utilized by the methods and systems of the present disclosure. The processor 540 can be a single core processor, a multi-core processor, a computing cluster, or any number of other configurations. The processor 540 can be connected through a bus 556 to one or more input and output devices. The memory 512 can include random access memory (RAM), read only memory (ROM), flash memory, or any other suitable memory systems.

Still referring to FIG. 5, a storage device 558 can be adapted to store supplementary data and/or software modules used by the processor. For example, the storage device 558 can store historical data and other related data as mentioned above regarding the present disclosure. Additionally, or alternatively, the storage device 558 can store historical data similar to data as mentioned above regarding the present disclosure. The storage device 558 can include a hard drive, an optical drive, a thumb-drive, an array of drives, or any combinations thereof.

The system can be linked through the bus 556 optionally to a display interface (not shown) adapted to connect the system to a display device (not shown), wherein the display device can include a computer monitor, camera, television, projector, or mobile device, among others.

The computer 511 can include a power source 554, depending upon the application the power source 554 may be optionally located outside of the computer 511. Linked through bus 556 can be a user input interface 557 adapted to connect to a display device 548, wherein the display device 548 can include a computer monitor, camera, television, projector, or mobile device, among others. A printer interface 559 can also be connected through bus 556 and adapted to connect to a printing device 532, wherein the printing device 532 can include a liquid inkjet printer, solid ink printer, large-scale commercial printer, thermal printer, UV printer, or dye-sublimation printer, among others. A network interface controller (NIC) 534 is adapted to connect through the bus 556 to a network 536, wherein data or other data, among other things, can be rendered on a third party display device, third party imaging device, and/or third party printing device outside of the computer 511.

Still referring to FIG. 5, the data or other data, among other things, can be transmitted over a communication channel of the network 536, and/or stored within the storage system 558 for storage and/or further processing. Further, the data or other data may be received wirelessly or hard wired from a receiver 546 (or external receiver 538) or transmitted via a transmitter 547 (or external transmitter 539) wirelessly or hard wired, the receiver 546 and transmitter 547 are both connected through the bus 556. The computer 511 may be connected via an input interface 508 to external sensing devices 544 and external input/output devices 541. The computer 511 may be connected to other external computers 542. An output interface 509 may be used to output the processed data from the processor 540.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A power generation system (PGS) with energy production and frequency regulation operated by independence regional energy operators working within the PGS, having a set of generators for producing energy to be later consumed by loads of the PGS, wherein the set of generators include at least one generator acting on regulating frequency of the PGS, and at least one generator that is a renewable source of energy, and a processor for estimating energy production and frequency regulation of each generator for a future period of a production time using an estimation of future generation and consumption of the energy of the PGS for the production time, such that the production of time includes equal lengths of segments of time, each segment of time includes a plurality of equal portions of time, and each of the portions of time includes equal sections of time, the system comprising:

an input interface in communication with sensors of the set of generators, for receiving data, wherein the processor is in communication with the input interface and is configured to determine a unit commitment schedule of each generator, wherein the commitment schedule includes a set of committed statuses, and a set of production set points for each of the segments of the production time, based on reducing a total cost of a unit commitment, a generation dispatch and the frequency regulation of each generator, wherein the production set points includes a generation output, a ramp-up reserve and a ramp-down reserve for a regulating generator from the set, renewable curtailment for the renewable generator, and load shedding for the loads to maintain system power balance over each segment of time under base scenarios and uncertain scenarios for loads and renewables, and wherein a cost of unit commitment includes start-up, shut-down, non-load, per unit variable cost, ramp-up and ramp-down cost, renewable curtailment cost, and load shedding cost for base scenario, and additional generation adjustment cost of uncertainty scenario; determine a generation dispatch plan for each generator for each of the segments of time, wherein the dispatch plan includes a set of production set points for the plurality of equal portions of time, based on reducing a total cost of generation dispatch and frequency regulation of each generator within at least one segment of time, where the production set points defines the generation output for the regulating generator, renewable curtailment for the renewable generator, and load shedding of the loads for each portion of time to maintain system power balance over each portion of time; where the cost of generation dispatch includes additional generation ramping-up and ramping-down cost, additional renewable curtailment cost and additional load shedding defined by the deviations between production set points between the time segment and the time portion, and two consecutive time portion; determine a frequency regulation scheme for each generator for each of the portions of time, wherein the frequency regulation scheme determines a set of production set points for regulating frequency, based on reducing a total cost of frequency regulation and performance within a predetermined range for each generator due to a variation of the energy production and demand within a corresponding portion of time, wherein the production set points define the generation output for the regulating generator, renewable curtailment for the renewable generator, and load shedding of the loads for each section of time to maintain system power balance over each section of time, wherein the cost of frequency regulation includes an additional cost related to a secondary frequency regulation, and an additional cost related to a performance of following regulation signals of a primary frequency controller, wherein the secondary frequency regulation cost includes a generation ramping-up cost and a generation ramping down cost defined by deviations of production set points between a time section and a time portion, two consecutive time sections, and deviations of a system angular frequency from a normal frequency in the time section; and iteratively update the unit commitment schedule, the generation dispatch plan and the frequency regulation scheme by adjusting the generation dispatch and frequency regulation cost functions for the unit commitment schedule and the generation dispatch plan with determined latest production set points, until a mismatch of total costs between two consecutive iterations are less than a pre-determined threshold;

a transceiver in communication with the processor to receive at each of the segments of time selected within the production time of the unit commitment schedule, an update on an energy generation of renewable source of energy and the energy consumption of the loads of the PGS; receive at each of the portions of time selected within the production time of the dispatch plan, an update on the energy generation of renewable source of energy and the energy consumption of the loads of the PGS; and receive, at each of the sections of time selected within the period of time of the frequency regulation scheme, an update on the energy generation of renewable source of energy and the energy consumption of the loads of the PGS;

a controller in communication with the processor for updating the unit commitment schedule, the generation dispatch plan, and the frequency regulation scheme for each generator based on updates on the energy generation of the renewable source of energy and the energy consumption of the loads of the PGS.

2. The system of claim 1, wherein the at least one generator of the set of generators has a controlled energy production, that adjusts energy production to regulate system frequency variation, and the at least one generator that is the renewable source of energy and has an uncontrolled energy production except energy curtailment.

3. The system of claim 1, wherein the generation dispatch and a frequency regulation cost is approximated as linear functions of production set points for the segments of time when determining the unit commitment schedule, wherein the equal lengths of the segments of time define a time resolution of the production time for an operational commitment schedule, such that the total cost of the unit commitment, the generation dispatch and the frequency regulation of all of the generators is minimized while satisfying system constraints, generator constraints and transmission constraints, and wherein the frequency regulation cost is approximated as the linear functions of the production set points for the portions of time when determining the generation dispatch plan, wherein the equal lengths of the portions of time define a time resolution of the production time for the dispatch plan, such that the total cost of the generation dispatch and the frequency regulation of all of the generators within at least one segment of time is minimized while satisfying system constraints, generator constraints and transmission constraints.

4. The system of claim 1, wherein the frequency regulation scheme is based on reducing the total frequency regulation cost of each generator for each of the sections of the corresponding portions of time, wherein the equal lengths of the sections of time define a time resolution of the production time for the frequency regulation scheme, such that the time resolution for the segments of time are a set of scheduled intervals of the production time for the unit commitment schedule, such that the total frequency regulation cost of all of the generators for each of the sections of the corresponding portions of time is minimized while satisfying system constraints, generator constraints and transmission constraints.

5. The system of claim 1, wherein the controller updates the unit commitment schedule, the generation dispatch plan, and the frequency regulation scheme for each generator based on the updates on the energy generation of the renewable source of energy and the energy consumption of the loads of the PGS, causes the set of generators to maintain an update committed status and produces an updated amount of energy, and causes the loads of the PGS to make an updated load shedding, and causes the generation of the renewable source of energy to make an update generation curtailment according to an updated operational commitment schedule.

6. The system of claim 1, wherein the processor is in communication with a compute readable memory, and stored in the computer readable memory is historical data and forecasting data, such that the historical data includes historical profiles for generation outputs of the renewable source of energy, historical profiles of loads of the PGS, forecasted profiles for generation outputs of the renewable source of energy, forecasted profiles of loads of the PGS.

7. The system of claim 1, wherein, the cost of the generation dispatch and the frequency regulation when determining the unit commitment schedule of each generator, is expressed as the linear function of the production set points for the segments of time, based on sensitivities of the dispatch cost and the frequency regulation cost over the production set points determined in the generation dispatch plan.

8. The system of claim 1, wherein the unit commitment schedule of each generator, satisfies minimum total upward and minimum downward regulation speed requirements for all of the generators in the PGS, such that an upward regulation speed for a generator in each segment of time is defined as a summation of a maximum start-up ramping rate when a generator is started or a maximum ramp-up rate when the generator is online for each generator, such that a downward regulation speed for a generator in a segment of time is defined as a summation of a maximum shut-down ramping rate when a generator is stopped or a maximum ramp-down rate when the generator is online.

9. The system of claim 1, wherein the unit commitment schedule of each generator, satisfies a relaxed power supply and demand balance constraints for a base scenario and a set of sample uncertainty scenarios, such that uncertainty scenarios are determined based on forecasted average values and covariance of bus net power injections that contributed from load demands and renewable generation of the PGS, using unscented transformation techniques, wherein the relaxed power supply and the demand balance constraint determines a sum of all power produced by the set of generators, deducted by curtailed power of renewables that is equal to a sum of loads, minus the load shed, wherein impacts of uncertain scenarios on unit commitment are represented by an additional generation adjustment cost determined based on deviations of production set points between the uncertain scenario and base scenario, where additional generation adjustment cost includes additional ramping costs, renewable curtailment cost, and load shedding cost.

10. The system of claim 1, wherein the cost of frequency regulation when determining the generation dispatch plan of each generator, is expressed as the linear function of the set of the production set points for the portions of time for generation dispatch plan, based on the sensitivities of the frequency regulation cost over production set points determined in the frequency regulation scheme.

11. The system of claim 1, wherein the cost of frequency regulation when determining the frequency regulation scheme of each generator, includes costs related to production set point changes among consecutive sections of time, system frequency deviations from rated frequency, and a performance of a primary regulation control, wherein the performance cost is determined based on the difference between mechanical output of generator and generator frequency regulation set points.

12. A method for power generation system (PGS), the PGS having energy production and frequency regulation operated by independence regional energy operators working within the PGS, estimating energy production and frequency regulation of each generator of a set of generators for a future period of a production time, using an estimation of future generation and consumption of energy of the PGS for the production time, such that the set of generators produce energy to be later consumed by loads of the PGS, the set of generators include at least one generator acting on frequency regulation, and at least one generator that is a renewable source of energy, comprising:

using a processor for
estimating the energy production and the frequency regulation of each generator for the future period of the production time using the estimation of future generation and consumption of the energy of the PGS for the production time, such that the production of time includes equal lengths of segments of time, each segment of time includes a plurality of equal portions of time, and each equal portion of time includes equal sections of time;

performing an offline stage by determining a unit commitment schedule of each generator, wherein the unit commitment schedule includes a set of committed statuses, and a set of production set points for each of the segments of the production time, based on reducing a total cost of a unit commitment, a generation dispatch and the frequency regulation of each generator, wherein the production set points includes a generation output, a ramp-up reserve and a ramp-down reserve for a regulating generator from the set, renewable curtailment for the renewable generator, and load shedding for the loads to maintain system power balance over each segment of time under base scenarios and uncertain scenarios for loads and renewables, and wherein a cost of unit commitment includes start-up, shut-down, non-load, per unit variable cost, ramp-up and ramp-down cost, renewable curtailment cost, and load shedding cost for base scenario, and additional generation adjustment cost of uncertainty scenario;

determining a generation dispatch plan for each generator for each of the segments of time, wherein the dispatch plan includes a set of production set points for the plurality of equal portions of time, based on reducing a total cost of the generation dispatch and the frequency regulation of each generator within at least one of the segments of time, where the production set points defines the generation output for the regulating generator, renewable curtailment for the renewable generator, and load shedding of the loads for each portion of time to maintain system power balance over each portion of time; where the cost of generation dispatch includes additional generation ramping-up and ramping-down cost, additional renewable curtailment cost and additional load shedding defined by the deviations between production set points between the time segment and the time portion, and two consecutive time portion;

determining a frequency regulation scheme for each generator for each of the portions of time, wherein the frequency regulation scheme determines a set of production set points for regulating frequency, based on reducing a total cost of frequency regulation and performance within a predetermined range for each generator due to a variation of the energy production and demand within a corresponding of the portions of time, wherein the production set points define the generation output for the regulating generator, renewable curtailment for the renewable generator, and load shedding of the loads for each section of time to maintain system power balance over each section of time, wherein the cost of frequency regulation includes an additional cost related to a secondary frequency regulation, and an additional cost related to a performance of following regulation signals of a primary frequency controller, wherein the secondary frequency regulation cost includes a generation ramping-up cost and a generation ramping down cost defined by deviations of production set points between a time section and a time portion, two consecutive time sections, and deviations of a system angular frequency from a normal frequency in the time section; and iteratively updating the unit commitment schedule, the generation dispatch plan and the frequency regulation scheme by adjusting the generation dispatch and frequency regulation cost functions for the unit commitment schedule and the generation dispatch plan with determined latest production set points, until a mismatch of total costs between two consecutive iterations are less than a pre-determined threshold; performing an online stage by using a transceiver in communication with the processor for receiving, at each of the segments of time selected within the production time of the unit commitment schedule, an update on an energy generation of the renewable source of energy and the energy consumption of the loads of the PGS; receiving, at each of the portions of time selected within the production time of the dispatch plan, an update on the energy generation of the renewable source of energy and the energy consumption of the loads of the PGS; and receiving, at each of the sections of time selected within the period of time of the frequency regulation scheme, an update on the energy generation of the renewable source of energy and the energy consumption of the loads of the PGS; and using a controller in communication with the processor for updating the unit commitment schedule, the generation dispatch plan, and the frequency regulation scheme for each generator based on updates on the energy generation of the renewable source of energy and the energy consumption of the loads of the PGS.

13. The method of claim 12, wherein the cost of the generation dispatch and the frequency regulation when determining the unit commitment schedule of each generator, is expressed as a linear function of the production set points for the segments of time for the unit commitment schedule based on sensitivities of the dispatch cost and the regulation cost over production set points determined in the generation dispatch plan, such that the unit commitment schedule satisfies minimum total upward and downward regulation speed requirements for all of the generators in the PGS, wherein an upward regulation speed for a generator in each segment of time is defined as a summation of a maximum start-up ramping rate when a generator is started or a maximum ramp-up rate when the generator is online for each generator, such that a downward regulation speed for a generator in a segment of time that is defined as a summation of a maximum shut-down ramping rate when a generator is stopped or a maximum ramp-down rate when the generator is online.

14. The method of claim 12, wherein the unit commitment schedule of each generator, satisfies a relaxed power supply and demand balance constraints for a base scenario and a set of sample uncertainty scenarios, such that uncertainty scenarios are determined based on forecasted average values and covariance of bus net power injections that contributed from load demands and renewable generation of the PGS, using unscented transformation techniques.

15. The method of claim 12, wherein the cost of frequency regulation when determining the generation dispatch plan of each generator, is expressed as a linear function of production set points for the portions of time for generation dispatch plan based on sensitivities of the frequency regulation cost over the production set points determined in the frequency regulation scheme, and wherein the cost of frequency regulation when determining the frequency regulation scheme of each generator, includes costs related to production set point changes among consecutive sections of time, system frequency deviations from rated frequency, and a performance of a primary regulation control.

16. The method of claim 12, wherein the generation dispatch and the frequency regulation cost are approximated as linear functions of production set points for the segments of time when determining the unit commitment schedule, wherein the equal lengths of the segments of time define a time resolution of the production time for an operational commitment schedule, and wherein the frequency regulation cost is approximated as the linear functions of production set points for the portions of time when determining the generation dispatch plan,
wherein the equal lengths of the portions of time define a time resolution of the production time for the dispatch plan, wherein the frequency regulation scheme is, based on reducing a total frequency regulation cost of each generator for each of a plurality of sections of the corresponding portions of time, and
wherein the equal sections of time define a time resolution of the production time for the frequency regulation scheme, wherein the controller updates the unit commitment schedule, the generation dispatch plan, and the frequency regulation scheme for each generator based on the updates on the energy generation of the renewable source of energy and the energy consumption of the loads of the PGS, causes the set of generators to maintain an update committed status and produces an updated amount of energy, and causes the loads of the PGS to make an updated load shedding, and causes the generation of the renewable source of energy to make an update generation curtailment according to an updated operational commitment schedule.

17. A non-transitory computer readable storage medium embodied thereon a program executable by a computer for performing a method, the method for power generation system (PGS), the PGS having energy production and frequency regulation operated by independence regional energy operators working within the PGS, estimating energy production and frequency regulation of each generator of a set of generators for a future period of a production time using an estimation of future generation and consumption of the energy of the PGS for the production time, wherein the set of generators produce energy to be later consumed by loads of the PGS, the set of generators include at least one generator acting on frequency regulation of the PGS, and at least one generator that is a renewable source of energy, the method comprising:
using a processor for
estimating energy production and frequency regulation of each generator for the future period of the production time using the estimation of future generation and consumption of the energy of the PGS for the production time, such that the production of time includes equal lengths of segments of time, each segment of time includes a plurality of equal portions of time, and each equal portion of time includes equal sections of time;
determining a unit commitment schedule of each generator, wherein the unit commitment schedule includes a set of committed statuses, and a set of production set points for each of the segments of the production time, based on reducing a total cost of a unit commitment, a generation dispatch and the frequency regulation of each generator, wherein the production set points includes a generation output, a ramp-up reserve and a ramp-down reserve for a regulating generator from the set, renewable curtailment for the renewable generator, and load shedding for the loads to maintain system power balance over each segment of time under base scenarios and uncertain scenarios for loads and renewables, and wherein a cost of unit commitment includes start-up, shut-down, non-load, per unit variable cost, ramp-up and ramp-down cost, renewable curtailment cost, and load shedding cost for base scenario, and additional generation adjustment cost of uncertainty scenario;
determining a generation dispatch plan for each generator for each of the segments of time, wherein the dispatch plan includes a set of production set points for the plurality of equal portions of time, wherein the production set points defines the generation output for the regulating generator, renewable curtailment for the renewable generator, and load shedding of the loads for each portion of time to maintain system power balance over each portion of time; where the cost of generation dispatch includes additional generation ramping-up and ramping-down cost, additional renewable curtailment cost and additional load shedding defined by the deviations between production set points between the time segment and the time portion, and two consecutive time portion;
determining a frequency regulation scheme for each generator for each of the portions of time, wherein the frequency regulation scheme determines a set of production set points for regulating frequency, based on reducing a total cost of frequency regulation and performance within a predetermined range for each generator due to a variation of the energy production and demand within a corresponding portion of time, wherein the production set points define the generation output for the regulating generator, renewable curtailment for the renewable generator, and load shedding of the loads for each section of time to maintain system power balance over each section of time, wherein the cost of frequency regulation includes an additional cost related to a secondary frequency regulation, and an additional cost related to a performance of following regulation signals of a primary frequency controller, wherein the secondary frequency regulation cost includes a generation ramping-up cost and a generation ramping down cost defined by deviations of production set points between a time section and a time portion, two consecutive time sections, and deviations of a system angular frequency from a normal frequency in the time section;

iteratively updating the unit commitment schedule, the generation dispatch plan and the frequency regulation scheme by adjusting the generation dispatch and frequency regulation cost functions for the unit commitment schedule and the generation dispatch plan with determined latest production set points, until a mismatch of total costs between two consecutive iterations are less than a pre-determined threshold; and updating an operational commitment schedule for each generator using the generation production adjustments of the corresponding production and frequency regulation costs over the determined set of production set points in the dispatch plan and frequency regulation scheme;

using a transceiver in communication with the processor for receiving at each of the portions of time selected within the production time of the dispatch plan, an update on an energy generation of the renewable source of energy and the energy consumption of the loads of the PGS;

receiving, at each of the sections of time selected within the period of time of the frequency regulation scheme, an update on the energy generation of the renewable source of energy and the energy consumption of the loads of the PGS; and using a controller in communication with the processor for updating the operational commitment schedule for each generator based on updates on the energy generation of the renewable source of energy and the energy consumption of the loads of the PGS, and for causing the generators to produce an updated amount of energy and maintain required frequency, and for causing the PGS to operate according to the updated operational commitment schedule.

18. The method of claim 17, wherein the generation dispatch cost and the frequency regulation cost when determining the unit commitment schedule of each generator, is approximated as linear functions of production set points for the segments of time based on sensitivities of corresponding cost over production set points for the unit commitment schedule that is determined in the generation dispatch plan, and wherein the unit commitment schedule when determining the unit commitment schedule of each generator, satisfies a relaxed power supply and demand balance constraints for a base scenario and a set of sample uncertainty scenarios, such that uncertainty scenarios are determined based on forecasted average values and covariance of load demands and renewable generation of the PGS, using unscented transformation techniques.

19. The method of claim 17, wherein the frequency regulation cost when determining the dispatch plan for each generator, is approximated as linear functions of the production set points for the portions of time based on sensitivities of corresponding cost over production set points for the dispatch plan determined in frequency regulation scheme.

20. The method of claim 17, wherein the cost of frequency regulation when determining the frequency regulation scheme for each generator, includes the costs related to production set point changes among consecutive sections of time, system frequency deviations from rated frequency and a performance of a primary regulation control.

* * * * *